US012587620B2

(12) United States Patent
Yoshida

(10) Patent No.: US 12,587,620 B2
(45) Date of Patent: Mar. 24, 2026

(54) CONTROL METHOD, CONTROL DEVICE, AND NON-TRANSITORY COMPUTER-READABLE STORAGE MEDIUM STORING CONTROL PROGRAM

(71) Applicant: SEIKO EPSON CORPORATION, Tokyo (JP)

(72) Inventor: Masataka Yoshida, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 368 days.

(21) Appl. No.: 18/324,214

(22) Filed: May 26, 2023

(65) Prior Publication Data

US 2023/0388464 A1    Nov. 30, 2023

(30) Foreign Application Priority Data

May 26, 2022    (JP) ................................ 2022-085847

(51) Int. Cl.
*H04N 9/31*    (2006.01)
(52) U.S. Cl.
CPC ......... *H04N 9/3188* (2013.01); *H04N 9/3185* (2013.01)
(58) Field of Classification Search
CPC .... G03B 21/14; G03B 21/147; H04N 9/3185; H04N 9/3188; H04N 9/3179
See application file for complete search history.

(56) References Cited

U.S. PATENT DOCUMENTS

2009/0122085 A1    5/2009    Iijima
2020/0077061 A1    3/2020    Ota et al.

FOREIGN PATENT DOCUMENTS

JP    2000-305694 A    11/2000
JP    2001-056729 A    2/2001
JP    2009-116823 A    5/2009
JP    2010-146279 A    7/2010
JP    2010-165291 A    7/2010
JP    2020-191586 A    11/2020
JP    2021-044813 A    3/2021

OTHER PUBLICATIONS

Panasonic Corporation, Geometry Manager Pro Manual, Date:May 2021, 23 pgs.
Panasonic Connect Co., Ltd., Software Applications, 6 pgs.
Epson, Business Projector Epson EB-L30000U /L30002U, 7 pgs.
Epson America.Inc., Epson Projector Professional Tool Operation Guide, Date: Jun. 21, 2021, 63 pgs.

*Primary Examiner* — Ryan D Howard
(74) *Attorney, Agent, or Firm* — Dority & Manning, P.A.

(57)    ABSTRACT

A control method includes displaying a display image including an adjustment image constituted by a plurality of control points, displaying a first enlarged image including a first enlarged adjustment image obtained by enlarging a part of the adjustment image, and receiving an operation input configured to select the control point using a pointing image configured to point any of the plurality of control points.

10 Claims, 16 Drawing Sheets

CONTROL METHOD, CONTROL DEVICE, AND NON-TRANSITORY COMPUTER-READABLE STORAGE MEDIUM STORING CONTROL PROGRAM

The present application is based on, and claims priority from JP Application Serial Number 2022-085847, filed May 26, 2022, the disclosure of which is hereby incorporated by reference herein in its entirety.

BACKGROUND

1. Technical Field

The present disclosure relates to a control method, a control device, and a non-transitory computer-readable storage medium storming a control program.

2. Related Art

There has been known a method of correcting a shape of an image to be projected by a projector on a display of a control device. JP-A-2021-44813 discloses a program of correcting an image to be projected by a projector. The program is executed by a control device to be coupled to the projector. The program makes a display of the control device display a preview image. The preview image includes a plurality of grid points to be correction targets. The control device receives a zoom operation by a user to perform enlarged display of the preview image to be displayed on the display.

By the preview image being displayed in an enlarged manner, it becomes easy for the user to select the grid points included in the preview image. However, it becomes difficult for the user to recognize a positional relationship in the whole of the preview image between the grid points included in the preview image thus enlarged.

SUMMARY

A control method according to the present disclosure includes displaying a display image including an adjustment image constituted by a plurality of control points, displaying a first enlarged image including a first enlarged adjustment image obtained by enlarging a part of the adjustment image, and receiving an operation input configured to select the control point using a pointing image for pointing any of the plurality of control points.

A control device according to the present disclosure includes at least one processor configured to execute generating display image data configured to make a display device display a display image including an adjustment image constituted by a plurality of control points, and enlarged display image data configured to make the display device display a first enlarged image including a first enlarged adjustment image obtained by enlarging a part of the adjustment image, and receiving an operation input of selecting the control point using a pointing image for pointing the control point.

A non-transitory computer-readable storage medium storing a control program according to the present disclosure makes at least one processor execute processing including displaying a display image including an adjustment image constituted by a plurality of control points, displaying a first enlarged image including a first enlarged adjustment image obtained by enlarging a part of the adjustment image, and receiving an operation input of selecting the control point using a pointing image for pointing the control point.

DESCRIPTION OF AN EXEMPLARY EMBODIMENT

Figure 1:
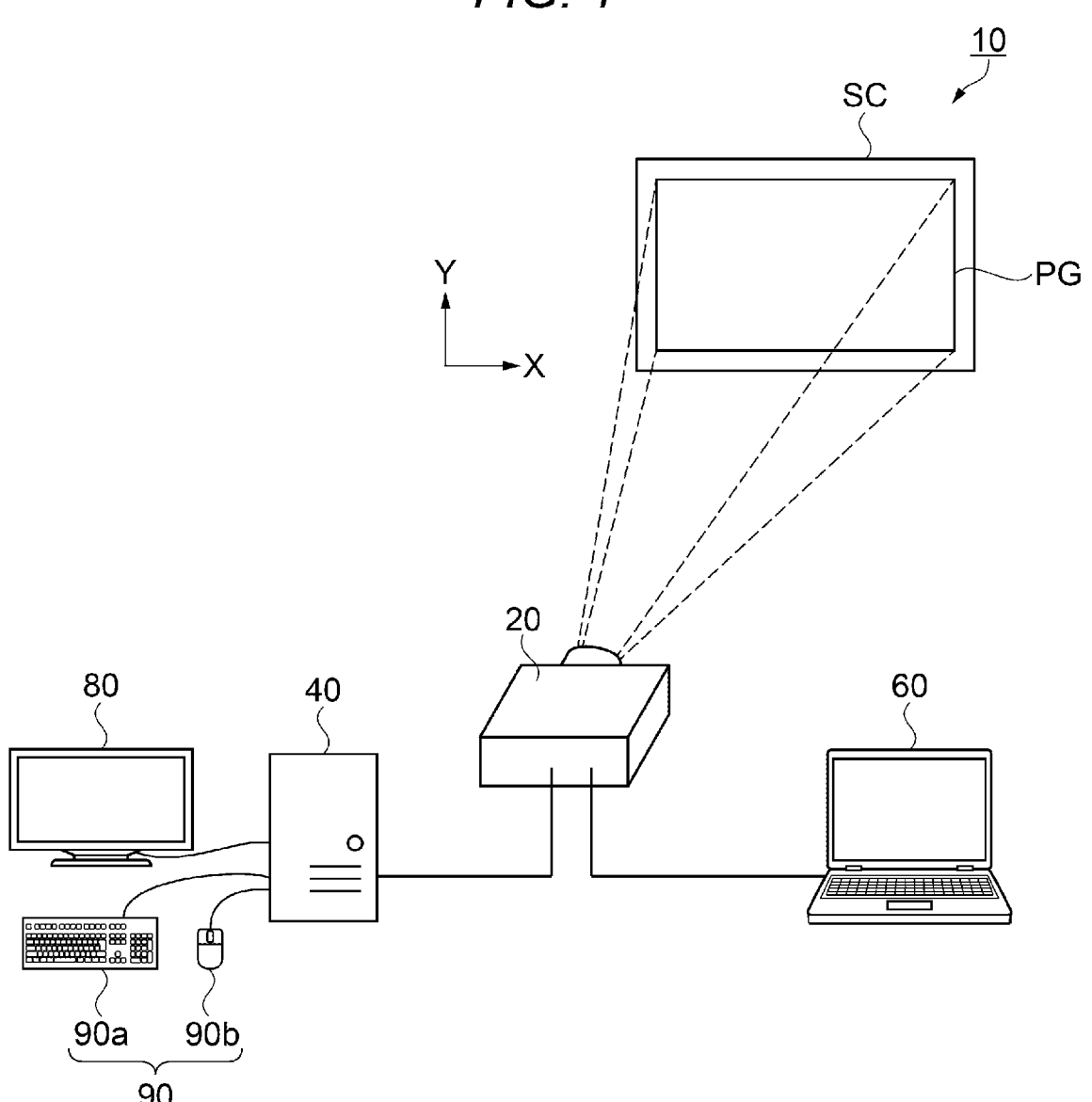
FIG. 1 is a diagram showing a schematic configuration of a display system.

FIG. 1 shows a schematic configuration of a display system 10. The display system 10 is provided with a projector 20, a display control device 40, and an image provision device 60. The projector 20 projects a projection image PG on a projection surface SC. The display control device 40 is coupled to a display 80 and an input device 90 so as to be able to perform transmission and reception. FIG. 1 shows a keyboard 90a and a mouse 90b as the input device 90. The display 80 and the input device 90 will be described later. The display system 10 shown in FIG. 1 is constituted by the single projector 20, but is not limited to this configuration. The display system 10 can be constituted by a plurality of the projectors 20.

The projector 20 projects a variety of projection images PG on the projection surface SC. The projector 20 is coupled to the display control device 40 and the image provision device 60 so as to be able to communicate with each other. The projector 20 projects the projection image PG on the projection surface SC based on display data input from the display control device 40 or image data input from the image provision device 60. The projector 20 corresponds to an example of a projection device.

The display control device 40 makes the projection image PG to be projected by the projector 20 be corrected. The display control device 40 is coupled to the projector 20 so as to be able to be communicated with each other. The display control device 40 transmits the display data, correction data, and so on to the projector 20. The projector 20 makes the projection image PG be projected on the projection surface SC based on the display data. The projector 20 corrects the projection image PG to be projected on the projection surface SC based on the correction data. The display control device 40 corresponds to an example of a control device. The display control device 40 is, for example, a personal computer.

The image provision device 60 provides the image data to the projector 20. The image provision device 60 transmits the image data to the projector 20. The projector 20 projects the image data received from the image provision device 60 on the projection surface SC. It is possible for the projector 20 to perform the correction on the image data using the correction data received from the display control device 40. The projector 20 projects the image data corrected with the correction data on the projection surface SC. The display system 10 shown in FIG. 1 is provided with the image provision device 60, but this is not a limitation. It is possible for the display control device 40 to function as the image provision device 60.

The projection surface SC displays the projection image PG projected from the projector 20. The projection surface SC displays a variety of projection images PG. The variety of projection images PG include a comparative image CG described later. The comparative image CG is projected on the projection surface SC based on the display data transmitted from the display control device 40 to the projector 20. The projection surface SC is a surface of an object on which the projection image PG is projected. It is possible for the projection surface SC to have a three-dimensional shape such as a surface having asperity or a curved surface. The projection surface SC can be formed of a screen or the like. FIG. 1 shows an X axis and a Y axis. The X axis and the Y axis are axes on the projection surface SC perpendicular to each other.

Figure 2:
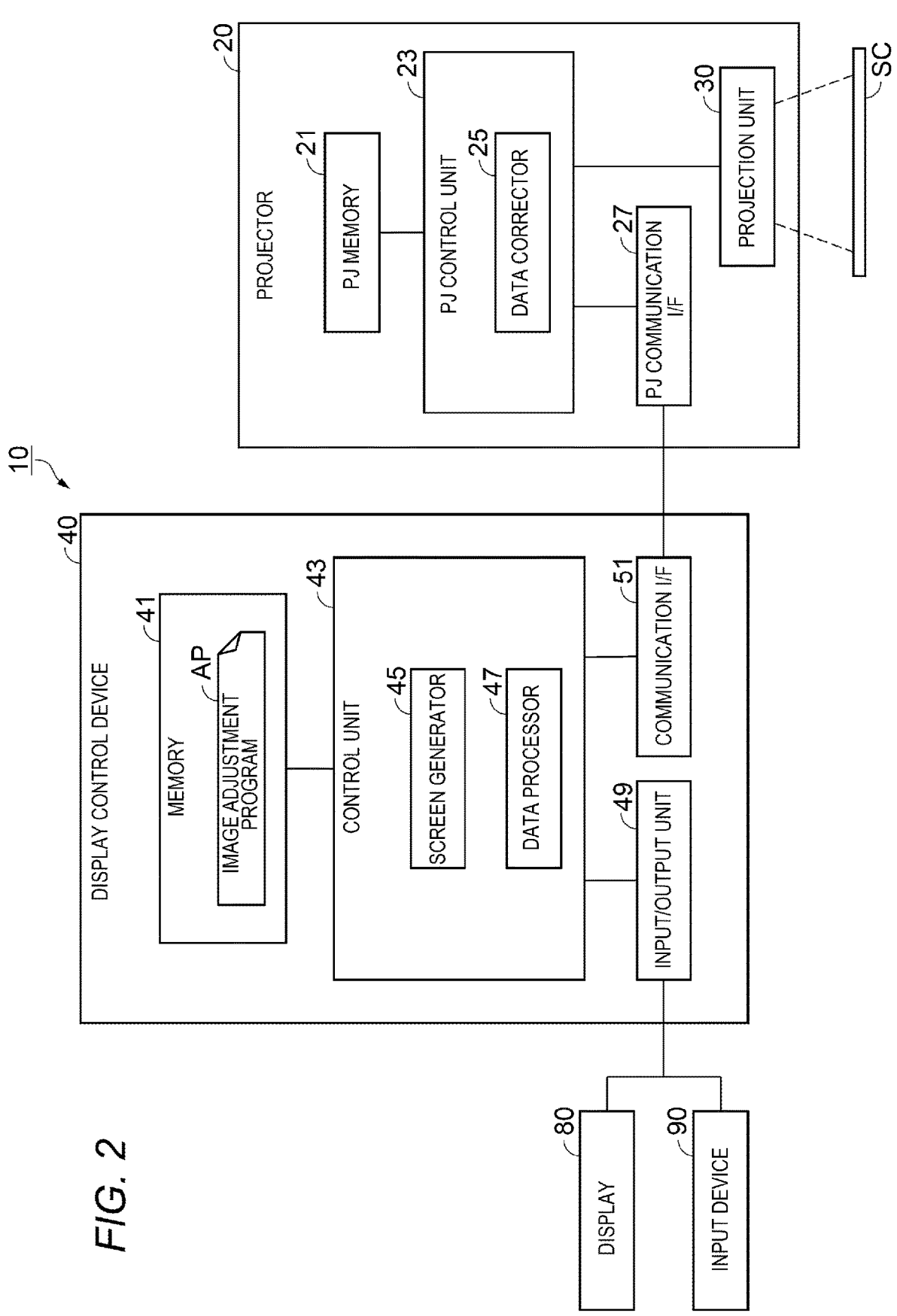
FIG. 2 is a diagram showing a block configuration of the display system.

FIG. 2 shows a block configuration of the display system 10. In the display system 10 shown in FIG. 2, the image provision device 60 is omitted. FIG. 2 shows the projector 20, the display control device 40, the display 80, the input device 90, and the projection surface SC.

The projector 20 is provided with a PJ memory 21, a PJ control unit 23, a PJ communication interface 27, and a projection unit 30. In FIG. 2, an interface is represented by I/F.

The PJ memory 21 stores a variety of types of data. The PJ memory 21 stores the correction data transmitted from the display control device 40, the display data transmitted from the display control device 40, the image data transmitted from the image provision device 60, and so on. It is possible for the PJ memory 21 to store a variety of programs operating in the PJ control unit 23. The PJ memory 21 is constituted by a ROM (Read Only Memory), a RAM (Random Access Memory), and so on.

The PJ control unit 23 is a projector controller for controlling the projector 20. The PJ control unit 23 is a processor having a CPU (Central Processing Unit) as an example. The PJ control unit 23 can also be formed of a single processor, or a plurality of processors. It is possible for the PJ control unit 23 to have a semiconductor memory such as a RAM or a ROM. The semiconductor memory functions as a work area for the PJ control unit 23. The PJ control unit 23 executes the program stored by the PJ memory 21 to thereby function as a data corrector 25.

The data corrector 25 performs a correction of the image data. The data corrector 25 performs a variety of corrections such as edge blending, a geometric distortion correction, or an image quality adjustment on the image data. The data corrector 25 performs the correction of the image data using the correction data stored in the PJ memory 21. It is possible for the data corrector 25 to divide the image data into unit areas to perform the correction for each of the unit areas.

The PJ communication interface 27 receives a variety of types of data such as the image data or the correction data. Communication connection is established between the PJ communication interface 27 and external devices such as the display control device 40 and the image provision device 60. The PJ communication interface 27 is connected to the external devices wirelessly or with wire in compliance with a predetermined communication protocol. The PJ communication interface 27 is provided with, for example, a connection port for wired communication, an antenna for wireless communication, and an interface circuit. The PJ communication interface 27 receives the display data, the correction data, and so on from the display control device 40. The PJ communication interface 27 receives the image data and so on from the image provision device 60. It is possible for the PJ Communication interface 27 to transmit a variety of types of data to the display control device 40 and the image provision device 60.

The projection unit 30 projects the projection image PG on the projection surface SC. The projection unit 30 projects the projection image PG on the projection surface SC based on the control by the PJ control unit 23. A schematic configuration of the projection unit 30 will be described later.

The display control device 40 is provided with a memory 41, a control unit 43, an input/output unit 49, and a communication interface 51. The display control device 40 is coupled to the display 80 and the input device 90 via the input/output unit 49.

The memory 41 stores a variety of types of data, a variety of programs, and so on. The memory 41 stores the display data, the correction data, and so on generated by the control unit 43. The memory 41 stores a program operating in the control unit 43. The program stored by the memory 41 includes an image adjustment program AP. The memory 41 is constituted by a ROM, a RAM, and so on. It is possible for the memory 41 to further be provided with a magnetic storage device such as an HDD (Hard Disk Drive), a semiconductor memory, and so on.

The control unit 43 is a controller for performing a variety of types of processing. The control unit 43 generates screen data for displaying a screen to be displayed on the display 80. The control unit 43 generates the correction data for correcting the projection image PG to be displayed by the projector 20. The control unit 43 transmits comparative image data to the projector 20. The comparative image data is display data for making the projector 20 project the comparative image CG on the projection surface SC. The comparative image CG will be described later. The control unit 43 is a processor having a CPU as an example. The control unit 43 can also be formed of a single processor, or a plurality of processors. It is possible for the control unit 43 to have a semiconductor memory such as a RAM or a ROM. The semiconductor memory functions as a work area for the control unit 43. The control unit 43 executes the program stored by the memory 41 to thereby function as a functional unit.

The control unit 43 makes the image adjustment program AP stored in the memory 41 operate to thereby function as a screen generator 45 and a data processor 47. The image adjustment program AP makes the display 80 display a management screen 100. The image adjustment program AP generates the correction data for correcting the projection image PG to be projected by the projector 20. The image adjustment program AP corresponds to an example of a control program.

The control unit 43 executes the image adjustment program AP to thereby function as the screen generator 45 and the data processor 47. The image generator 45 and the data processor 47 are the function units. The control unit 43 functions as the function unit to thereby generate management screen data for making the display 80 display the management screen 100. The management screen data is the screen data.

The screen generator 45 generates the management screen data to be transmitted to the display 80. The management screen data makes the display 80 display the management screen 100. The management screen data is constituted by a plurality of types of data including preview image window data and enlarged preview image window data. The preview image window data and the enlarged preview image window data will be described later. The screen generator 45 transmits the management screen data thus generated to the input/output unit 49.

The screen generator 45 generates the comparative image data to be transmitted to the projector 20. The comparative image data makes the projector 20 project the comparative image CG on the projection surface SC. The comparative image data will be described later. The screen generator 45 transmits the comparative image data thus generated to the communication interface 51.

The data processor 47 generates the correction data for correcting the projection image PG. The data processor 47 generates the correction data based on user setting data received via the input/output unit 49. The data processor 47 transmits the correction data thus generated to the communication interface 51. It is possible for the data processor 47 to transmit the correction data thus generated to the memory 41. The memory 41 stores the correction data received.

The correction data is data for making a variety of corrections such as a geometric distortion correction be performed. The geometric distortion correction is processing of correcting a distortion of an image. The distortion of the image is generated when the projection surface SC is a curved surface, or when the projection surface SC has unevenness. The distortion of the image which occurs in the latter case occurs when the projector 20 projects the projection image PG from a position other than the front of the projection surface SC. The correction data is generated based on input data input by an operation of the user. The correction data adjusts the distortion of the image to be projected on the projection surface SC.

The input/output unit 49 is coupled to a variety of devices such as the display 80 and the input device 90, and transmits and receives a variety of types of data. The input/output unit 49 is an input/output interface to be coupled to the variety of devices. The input/output unit 49 has a communication port compliant with the USB (Universal Serial Bus) standard, at least one connection port such as DisplayPort, and an interface circuit. The input/output unit 49 shown in FIG. 2 is coupled to the display 80 and the input device 90. The input/output unit 49 transmits the screen data to the display 80. The input/output unit 49 receives the input data output from the input device 90. The input/output unit 49 receives the screen data generated by the screen generator 45, and then transmits the screen data to the display 80. The input/ output unit 49 transmits the input data thus received to the data processor 47. The input/output unit 49 corresponds to an example of a transmitter.

Communication connection is established between the communication interface 51 and the external devices such as the projector 20. The communication interface 51 is connected to the external devices wirelessly or with wire in compliance with a predetermined communication protocol. The communication interface 51 shown in FIG. 2 is connected to the PJ communication interface 27 of the projector 20 so as to be able to communicate with the PJ communication interface. The communication interface 51 is provided with, for example, a connection port for wired communication, an antenna for wireless communication, and an interface circuit. The communication interface 51 receives the comparative image data from the screen generator 45. The communication interface 51 transmits the comparative image data thus received to the projector 20. The communication interface 51 receives the correction data from the data processor 47. The communication interface 51 transmits the correction data thus received to the projector 20. It is possible for the communication interface 51 to receive a variety of types of data transmitted from the projector 20.

The display 80 displays the screen based on the screen data transmitted from the display control device 40. The display 80 is connected to the input/output unit 49. The display 80 displays the management screen 100 based on the management screen data transmitted from the display control device 40. The display 80 displays a cursor 200 which moves based on an operation input by the user input to the input device 90. The display 80 receives the input data based on the operation input by the user via the input/output unit 49. The display 80 is formed of a display panel such as a liquid crystal panel or an organic EL (electro-luminescence) panel. It is possible for the display 80 to receive the input data from the input device 90. The display 80 corresponds to an example of the display device. The cursor 200 corresponds to an example of a pointing image. It is sufficient for the display 80 to be a device capable of displaying a screen based on the image data transmitted from the display control device 40, and it is possible to use a direct-view display device or a projector.

The input device 90 receives an operation input by the user. The input device 90 obtains input data based on the operation input by the user. The input device 90 transmits the input data thus obtained to the input/output unit 49. It is possible for the input device 90 to transmit the input data thus obtained to the display 80. The input device 90 is constituted by at least one device. The input device 90 shown in FIG. 1 is constituted by the keyboard and the mouse 90b. The input device 90 is not limited to the keyboard 90a and the mouse 90b. The input device can be constituted by a liquid crystal pen tablet, a pointer, or the like.

In the display system 10 shown in FIG. 2, the display 80 and the input device 90 are coupled to the display control device 40, but this configuration is not a limitation. It is possible for the display 80 to have a touch-input function. When the display 80 has the touch-input function, the display 80 functions as the input device 90. The display 80 and the input device 90 shown in FIG. 2 are configured as separated bodies from the display control device 40, but this is not a limitation. At least either one of the display 80 and the input device 90 can be configured integrally with the display control device 40.

Figure 3:
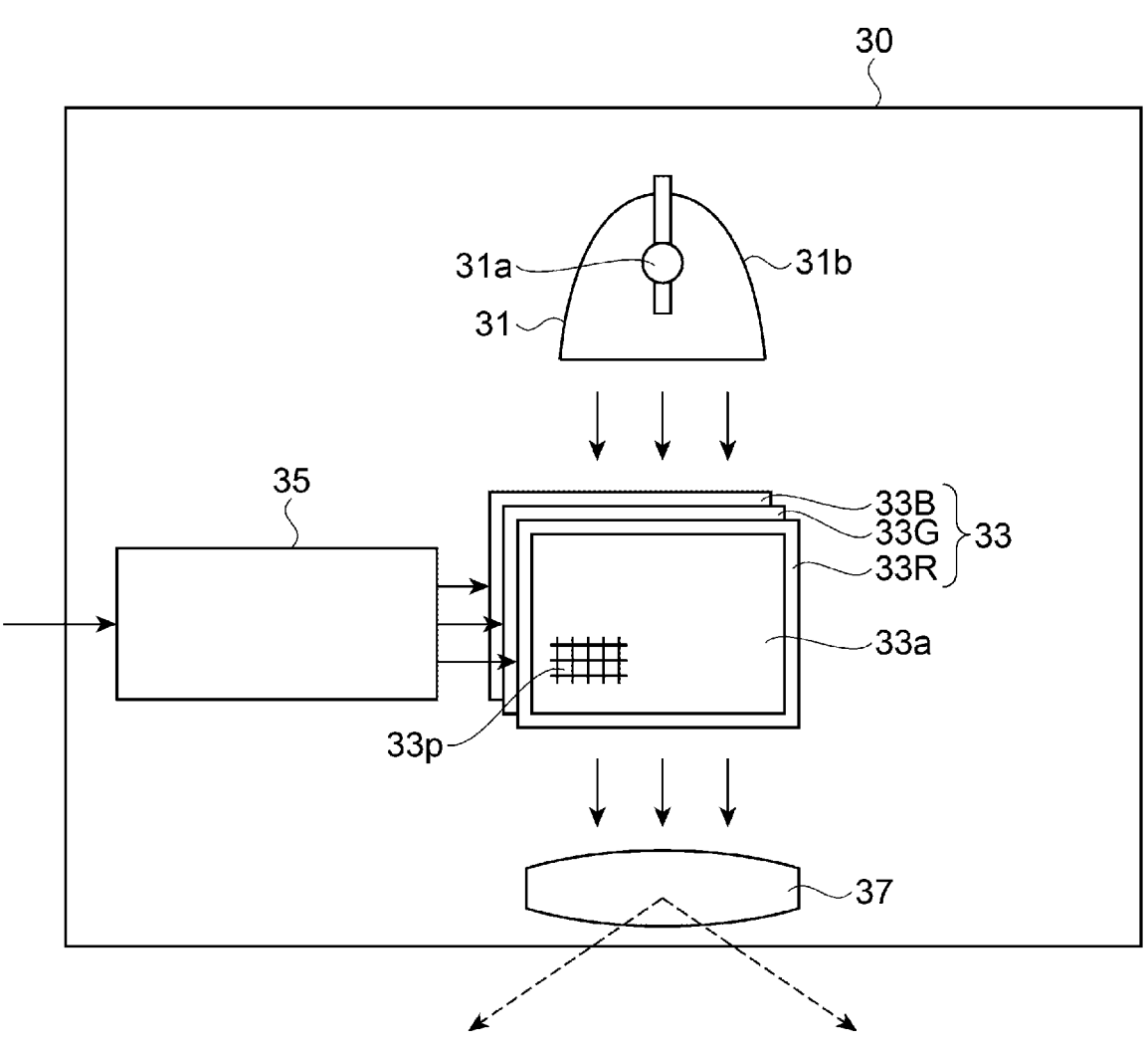
FIG. 3 is a diagram showing a schematic configuration of a projection unit.

FIG. 3 shows a schematic configuration of the projection unit 30. FIG. 3 shows an example of the projection unit 30.

The projection unit 30 is provided with a light source 31, three liquid crystal light valves 33, a light valve driver 35, and a projection lens 37.

The light source 31 projects light to the liquid crystal light valves 33. The light source 31 is provided with a light source unit 31a, a reflector 31b, an integrator optical system not shown, and a color separation optical system not shown. The light source unit 31a emits the light. The light source unit 31a is formed of a xenon lamp, a super-high pressure mercury lamp, an LED, a laser light source, or the like. The light source 31 emits the light based on control by the PJ control unit 23. The reflector 31b reduces a variation in direction of the light emitted by the light source unit 31a. The integrator optical system reduces a variation in luminance distribution of the light emitted from the light source 31. The color separation optical system separates the light having passed through the reflector 31b into colored-light components of red, green, and blue.

The liquid crystal light valves 33 each modulate the light emitted from the light source 31. The liquid crystal light valves 33 modulate the light to thereby generate the projection image PG. The liquid crystal light valves 33 are each formed of a liquid crystal panel having a liquid crystal material encapsulated between a pair of transparent substrates, and so on. The liquid crystal light valves 33 are each provided with a pixel area 33a which includes a plurality of pixels 33p arranged in a matrix, and which has a rectangular shape. In each of the liquid crystal light valves 33, a drive voltage is applied to the liquid crystal for each of the pixels 33p. The projection unit 30 shown in FIG. 3 is constituted by the three liquid crystal light valves 33.

The three liquid crystal light valves 33 are a red-light liquid crystal light valve 33R, a green-light liquid crystal light valve 33G, and a blue-light liquid crystal light valve 33B. The red colored-light component separated by the color separation optical system enters the red-light liquid crystal light valve 33R. The green colored-light component separated by the color separation optical system enters the green-light liquid crystal light valve 33G. The blue colored-light component separated by the color separation optical system enters the blue-light liquid crystal light valve 33B.

The light valve driver 35 applies drive voltages to the respective pixels 33p based on the image data received from the PJ control unit 23. The drive voltages are supplied by a drive source not shown. It is possible for the light valve driver 35 to apply the drive voltages to the respective pixels 33p based on the image data corrected by the data corrector 25. When the light valve driver 35 applies the drive voltages to the respective pixels 33p, each of the pixels 33p is set on the light transmittance based on the image data. The light emitted from the light source 31 passes through the pixel area 33a to thereby be modulated. The three liquid crystal light valves 33 form color component images of the respective colored light.

The projection lens 37 combines the color component images formed by the liquid crystal light valves 33, and then projects the result in an enlarged manner. The projection lens 37 projects the projection image PG on the projection surface SC. The projection image PG is an image obtained by combining the color component images with each other.

Figure 4:
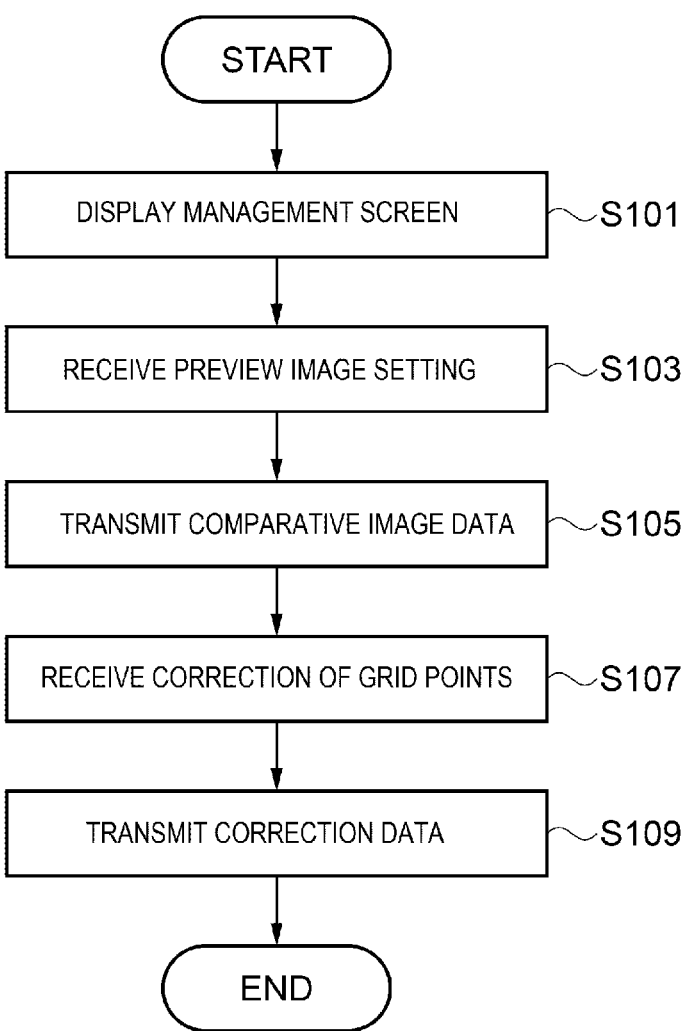
FIG. 4 is a diagram showing a flowchart of a geometric distortion correction.

It is possible for the display control device 40 to make the user perform the correction of the projection image PG to be projected on the projection surface SC by the projector 20. FIG. 4 shows a flowchart of the geometric distortion correction. FIG. 4 shows a correction procedure of the geometric distortion correction performed by the display control device 40. It is possible for the user to correct the projection image PG to be projected on the projection surface SC by performing an input operation on the input device 90.

In the step S101, the display control device 40 makes the display 80 display the management screen 100. The details of the management screen 100 will be described later. When the user makes the image adjustment program AP be executed, the display control device 40 makes the display 80 display the management screen 100. The management screen 100 is one of a plurality of screens to be displayed when the image adjustment program AP is executed. It is possible for the management screen 100 to be displayed on the display 80 when the user performs an operation input of designating the display of the management screen 100.

After the management screen 100 is displayed on the display 80, the display control device 40 receives preview image setting by the user in the step S103. The preview image setting is an example of the input data. When the user performs the operation input using the input device 90, the display control device 40 receives the preview image setting. The preview image setting is the number of grid points 143P, or the like. The preview image setting is set by the number of the grid points 143P in a vertical direction and the number of the grid points 143P in a horizontal direction. The vertical direction represents a vertical direction in the management screen 100. The horizontal direction represents a horizontal direction in the management screen 100.

After the display control device 40 receives the preview image setting, the display control device 40 transmits the comparative image data to the projector 20 in the step S105. The display control device 40 generates the comparative image data based on the preview image setting thus set. The display control device 40 transmits the comparative image data thus generated to the projector 20. The projector 20 receives the comparative image data, and then projects the comparative image CG based on the comparative image data thus received on the projection surface SC.

Figure 5:
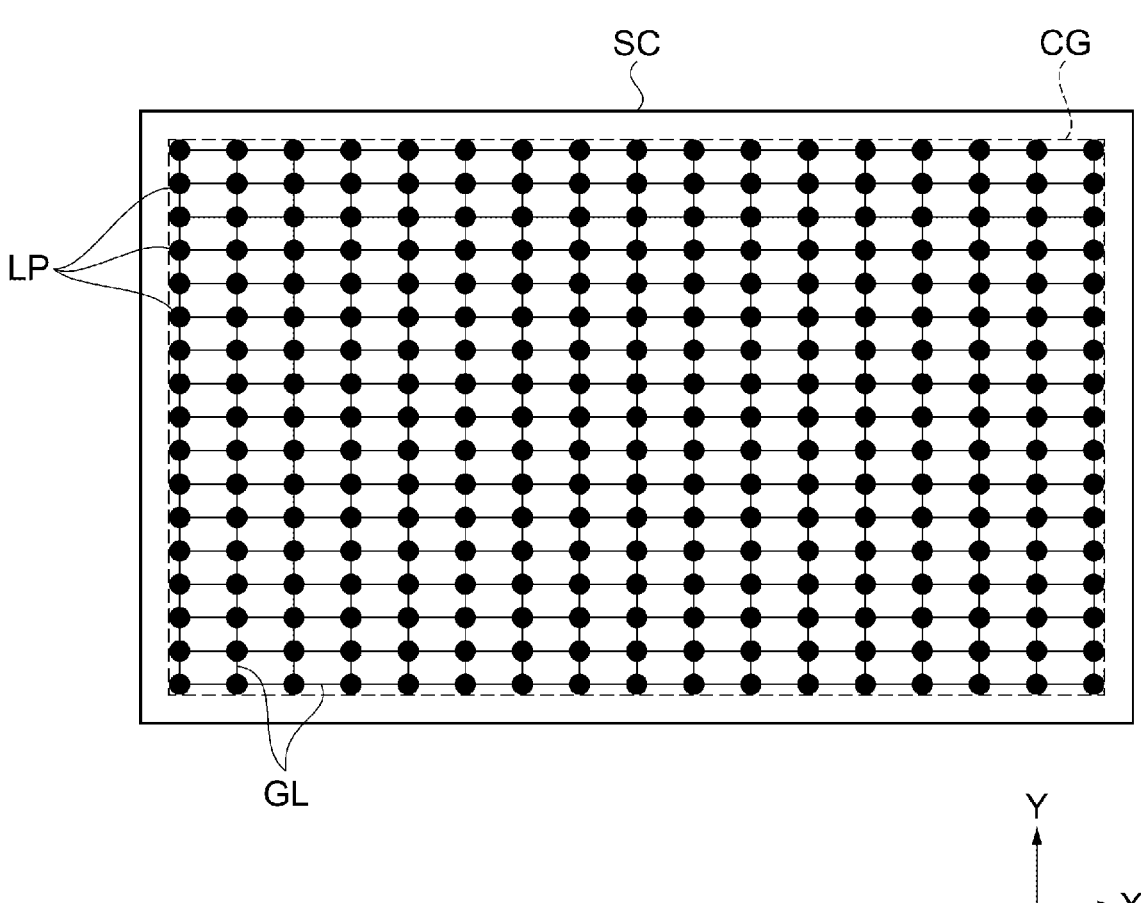
FIG. 5 is a diagram showing an outline of a comparative image to be projected on a projection surface.

FIG. 5 shows an outline of the comparative image CG to be projected on the projection surface SC. FIG. 5 shows an example of the comparative image CG. The comparative image CG shown in FIG. 5 is an image when the grid points 143P arranged as much as 17 in the vertical direction and as much as 17 in the horizontal direction are set in the preview image setting. The comparative image CG is an example of the projection image PG. The horizontal direction in the preview image setting and the X axis in the projection surface SC correspond to each other. The vertical direction in the preview image setting and the Y axis in the projection surface SC correspond to each other.

The comparative image CG includes a plurality of comparative grid points LP and a plurality of comparative grid lines GL. The plurality of comparative grid points LP is arranged at predetermined intervals along the X axis and the Y axis. The plurality of comparative grid points LP shown in FIG. 5 is arranged at uniform intervals along the X axis. Further, the plurality of comparative grid points LP shown in FIG. 5 is arranged at uniform intervals along the Y axis. Out of the plurality of comparative grid lines GL, the comparative grid lines GL extending along the X axis each connect the plurality of comparative grid points LP arranged along the X axis to each other. Out of the plurality of comparative grid lines GL, the comparative grid lines GL extending along the Y axis each connect the plurality of comparative grid points LP arranged along the Y axis to each other.

When the projection surface SC is a smooth surface, the plurality of comparative grid points LP is arranged uniformly along the X axis and the Y axis as shown in FIG. 5. When the projection surface SC has an uneven portion, the comparative grid points LP to be projected at positions in the uneven portion are projected at positions different from the positions arranged uniformly. The user confirms the comparative grid points LP to be projected at the position different from the positions arranged uniformly included in the comparative image CG as correction points.

After the display control device 40 makes the projector 20 project the comparative image CG, the display control device 40 receives the correction of the grid points 143P in the step S107 shown in FIG. 4. The display control device 40 makes the display 80 display a preview image 143 corresponding to the preview image setting set in the step S103. The preview image 143 is displayed in the management screen 100. The user confirms the grid points 143P in the preview image 143 corresponding to the correction points as target points. When the user performs the operation input for moving the target points with the input device 90, the display control device 40 receives the correction of the grid points 143P as the target points. The display control device 40 receives the correction of the grid points 143P as the target points as the input data.

After the display control device 40 receives the correction of the grid points 143P as the target points, the display control device 40 transmits the correction data to the projector 20 in the step S109. The display control device 40 receives the operation input of moving the grid points 143P as the target points as the correction of the grid points 143P. The display control device 40 generates the correction data based on the correction of the grid points 143P thus received. The display control device 40 transmits the correction data thus generated to the projector 20.

The projector 20 receives the correction data. The projector 20 corrects the comparative image data using the correction data. The projector 20 projects the comparative image data thus corrected, on the projection surface SC. The user confirms the comparative image CG projected based on the comparative image data which is corrected with the correction data. The user confirms whether or not the comparative grid points LP included in the comparative image CG projected on the projection surface SC are arranged at predetermined intervals along the X axis and the Y axis. When the user determines that the comparative grid points LP are arranged at the predetermined intervals, the user terminates the correction processing. When the user determines that the comparative grid points LP are not arranged at the predetermined intervals, the user performs an operation input of moving the grid points 143P. When the user performs the operation input, the display control device 40 receives the correction of the grid points 143P as the target points as represented by the step S107. The display control device 40 generates the correction data once again based on the correction of the grid points 143P thus received. The display control device 40 transmits the correction data which has been generated once again, to the projector 20. When the user performs the operation input of moving the grid points 143P, the display control device 40 repeatedly performs the step S107 and the step S109.

Figure 6:
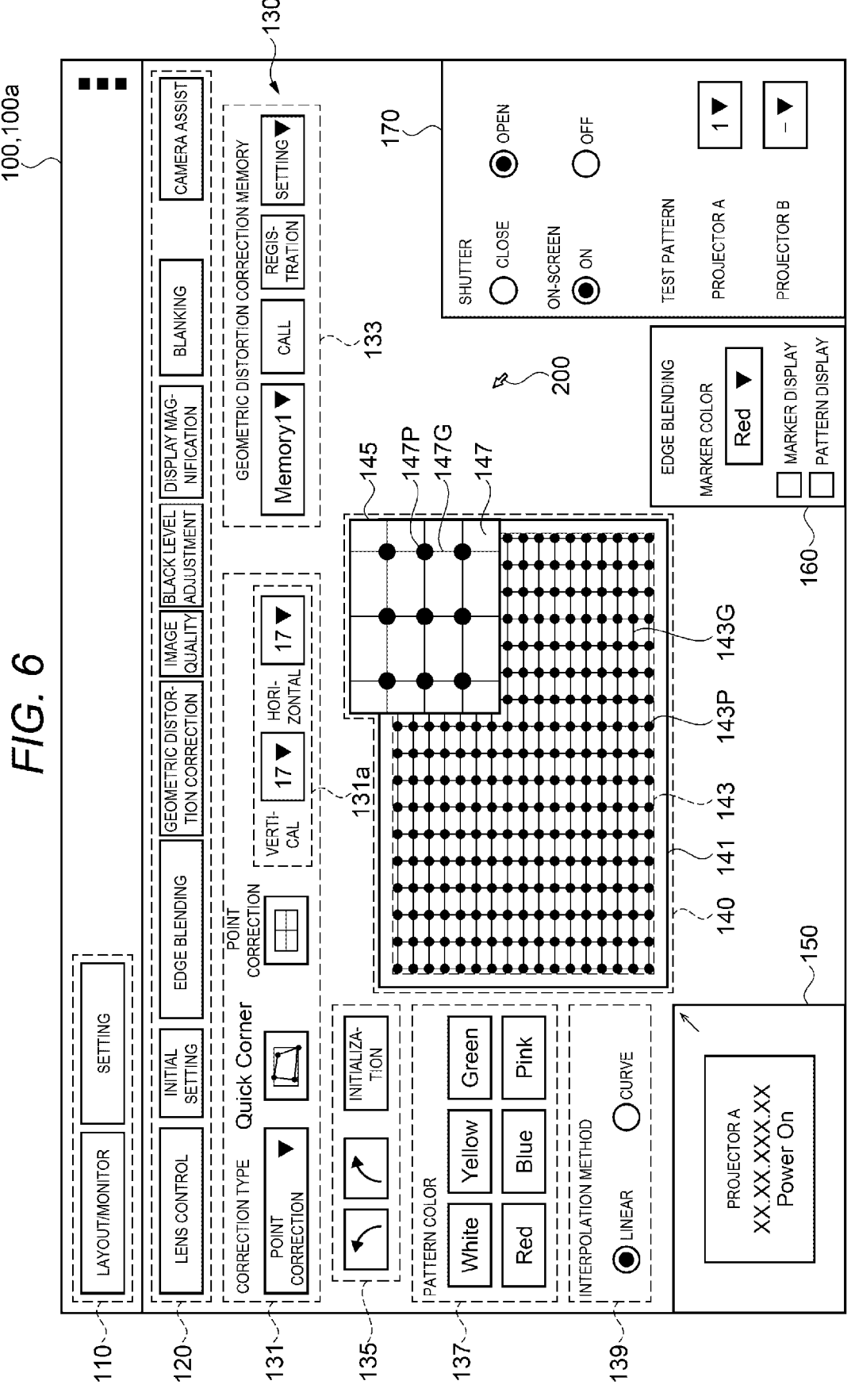
FIG. 6 is a diagram showing a configuration of a management screen.

FIG. 6 shows a configuration of the management screen 100. The management screen 100 is displayed on the display 80 based on the control by the display control device 40. The management screen 100 is displayed on the display 80 when the display control device 40 executes the image adjustment program AP. The management screen 100 shown in FIG. 6 is a screen to be displayed when performing the geometric distortion correction. FIG. 6 shows a first management screen 100a as an example of the management screen 100.

The first management screen 100a includes a basic setting area 110, a tab area 120, a geometric distortion correction area 130, a sub-window display area 150, an edge blending area 160, and a projector setting area 170. The sub-window display area 150, the edge blending area 160, and the projector setting area 170 are displayed so as to be superimposed on the geometric distortion correction area 130.

In the basic setting area 110, there are displayed a layout/monitor tab and a setting tab. When the layout/monitor tab is selected by the operation input by the user, a layout/monitor area is displayed in the first management screen 100a. When the setting tab is selected by the operation input by the user, a setting area is displayed in the first management screen 100a.

In the layout/monitor area, there is displayed a state of the projector 20 to be coupled to the display control device 40. The layout/monitor area is not illustrated. The display control device 40 can be coupled to a plurality of the projectors 20. When the display control device 40 is coupled to the plurality of projectors the states of the plurality of projectors 20 are displayed in the layout/monitor area. The state of the projector 20 is a power ON/OFF state, a connection state including a network address, an error occurrence state, and so on. When the plurality of projectors 20 is coupled to the display control device 40, a layout of the plurality of projectors 20 is displayed in the layout/monitor area.

The setting area is an area for performing a variety of types of settings. When the user selects one of the plurality of tabs displayed in the tab area 120 using the operation input, an area corresponding to the tab thus selected is displayed in the first management screen 100a. In the first management screen 100a shown in FIG. 6, there is shown the geometric distortion correction area 130 for setting the geometric distortion correction.

In the tab area 120, there are displayed a lens control tab, an initial setting tab, an edge blending tab, a geometric distortion correction tab, an image quality tab, a black level adjustment tab, a display magnification tab, a blanking tab, and a camera assist tab.

When the lens control tab is selected by the operation input by the user, a lens control setting area is displayed in the first management screen 100a. The lens control setting area is not illustrated. In the lens control setting area, there are displayed a variety of icons and so on for controlling the lens of the projector 20 to be coupled to the display control device 40. The user performs the operation input on the variety of icons and so on displayed in the lens control setting area to thereby adjust the focus of the lens and so on.

When the initial setting tab is selected by the operation input by the user, an initial setting area is displayed in the first management screen 100a. The initial setting area is not illustrated. In the initial setting area, there are displayed a variety of icons and so on related to the setting of the projector 20 to be coupled to the display control device 40. The user performs the operation input on the variety of icons and so on displayed in the initial setting area to thereby perform a variety of initial settings. The initial settings are a calibration of a projector light source, a luminance level, initialization of the PJ memory 21, and so on.

When the edge blending tab is selected by the operation input by the user, an edge blending setting area is displayed in the first management screen 100a. The edge blending setting area is not illustrated. The edge blending setting area is displayed when creating a train of projection image PG with the plurality of projectors 20 based on the control by the display control device 40. In the edge blending setting area, there are displayed a variety of icons and so on for adjusting the projection image PG. The user performs the operation input on the variety of icons and so on displayed in the edge blending setting area to thereby adjust a range in which the plurality of projection images PG are superimposed, and so on.

When the image quality tab is selected by the operation input by the user, an image quality setting area is displayed in the first management screen 100*a*. The image quality setting area is not illustrated. In the image quality setting area, there are displayed a variety of icons related to the image quality settings of the projection image PG to be projected on the projection surface SC by the projector 20 to be coupled to the display control device 40. The user performs the operation input on the variety of icons and so on displayed in the image quality setting area to thereby perform the image quality settings. The image quality settings to be set are color matching, brightness, contrast, frame interpolation, and so on.

When the black level adjustment tab is selected by the operation input by the user, a black level adjustment area is displayed in the first management screen 100*a*. The black level adjustment area is not illustrated. In the black level adjustment area, there are displayed a variety of icons related to the black level adjustment of the projection image PG to be projected on the projection surface SC by the plurality of projectors 20 to be coupled to the display control device 40. The user performs the operation input on the variety of icons and so on displayed in the black level adjustment area to thereby perform the black level adjustment. The black level adjustment is an adjustment of luminance, color shade, and so on of a portion where pictures are not superimposed.

When the display magnification tab is selected by the operation input by the user, a display magnification setting area is displayed in the first management screen 100*a*. The display magnification setting area is not illustrated. In the display magnification setting area, there are displayed a variety of icons related to the display magnification of the projection image PG to be projected on the projection surface SC by the projector 20 to be coupled to the display control device 40. The user performs the operation input on the variety of icons and so on displayed in the display magnification setting area to thereby perform the display magnification setting. The display magnification setting is magnification setting when magnifying a part of the projection image PG.

When the blanking tab is selected by the operation input by the user, a blanking setting area is displayed in the first management screen 100*a*. The blanking setting area is not illustrated. In the blanking setting area, there are displayed a variety of icons related to settings of the projection image PG to be projected on the projection surface SC by the projector 20 to be coupled to the display control device 40. The user performs the operation input on the variety of icons and so on displayed in the blanking setting area to thereby perform the blanking setting. The blanking setting is setting of hiding a specific area of the projection image PG.

When the camera assist tab is selected by the operation input by the user, a camera assist adjustment area is displayed in the first management screen 100*a*. The camera assist adjustment area is not illustrated. In the camera assist adjustment area, there are displayed a variety of icons for executing an automatic adjustment of the projection image PG using a camera or the like incorporated in the projector 20 to be coupled to the display control device 40. The user performs the operation input on the variety of icons and so on displayed in the camera assist adjustment area to thereby execute a variety of automatic adjustments to the projection image PG. The automatic adjustments to the projection image PG are screen matching, color calibration, tiling, and so on.

When the geometric distortion correction tab is selected by the operation input by the user, the geometric distortion correction area 130 shown in FIG. 6 is displayed in the first management screen 100*a*. In the geometric distortion correction area 130, there are displayed a variety of icons and so on related to the geometric distortion correction. In the geometric distortion correction area 130, there are displayed a correction setting part 131, a file setting part 133, an operation pointing part 135, a color setting part 137, a method setting part 139, and a preview image correction part 140.

In the correction setting part 131, there are displayed a variety of icons related to setting of a correction type, a correction type display field for displaying the correction type selected, a preview image setting field 131*a*, and so on. The correction types to be selected are a curved-surface projection correction, a corner projection correction, a point correction, a curvature correction, and so on. The preview image setting shown in the step S103 shown in FIG. 4 is received in the preview image setting field 131*a*. In the preview image setting field 131*a* shown in FIG. 6, there are received the number of the grid points 143P in the vertical direction and the number of the grid points 143P in the horizontal direction.

In the file setting part 133, there are displayed a variety of icons and so on for receiving instructions related to a setting file including the distortion correction setting set in the geometric distortion correction area 130. The user performs the operation input on the variety of icons and so on displayed in the file setting part 133 to thereby instruct saving of the setting file in the memory 41, and so on.

In the operation pointing part 135, there are displayed a variety of icons for performing the control on the operation input performed by the user in the geometric distortion correction area 130. The user performs the operation input on the variety of icons displayed in the operation pointing part 135 to thereby perform cancellation of the operation input which has been input at the last minute, and so on.

In the color setting part 137, there are displayed a plurality of icons related to designation of the color of the grid points 143P displayed in the preview image correction part 140. When the user performs the operation input on one of the plurality of icons displayed in the color setting part 137, the color of the grid points 143P displayed in the preview image correction part 140 is changed.

In the method setting part 139, there are displayed selection buttons for selecting the interpolation method between the grid points 143P. In the method setting part 139 shown in FIG. 6, it is possible to select one of linear interpolation and curve interpolation. The interpolation method is a position correction method between the grid points 143P adjacent to each other.

In the preview image correction part 140, there are received selection and translation of the grid points 143P by the operation input by the user. In the preview image correction part 140, there are displayed a display window 141 and an enlarged display window 145.

In the display window 141, there is displayed the preview image 143. The preview image 143 corresponds to the comparative image CG to be projected on the projection surface SC by the projector 20. The preview image 143 is constituted by the grid points 143P and grid lines 143G. The display window 141 is displayed based on display window data. The display window data is generated by the screen generator 45 using default screen data stored in the memory 41. The default screen data includes the number of the grid points 143P set in advance, and intervals between the grid points 143P. The number of the grid points 143P included in the default screen data is corrected with a value input to the preview image setting field 131*a*. The display window data includes the number of the grid points 143P corrected based on the value input to the preview image setting field 131*a*. In the display window 141, there is displayed the whole of the preview image 143. The display window data is included in the management screen data. The display window 141 corresponds to an example of a display image. The display window data corresponds to an example of display image data.

The display window data generated in the screen generator 45 is transmitted to the display 80 by the input/output unit 49. The display 80 receives the display window data. The display 80 displays the display window 141 in the first management screen 100*a* based on the display window data thus received. The display control device 40 makes the display 80 display the display window 141 based on the display window data.

The preview image 143 is constituted by the plurality of grid points 143P and the plurality of grid lines 143G. The grid points 143P are arranged at predetermined intervals along a vertical axis of the first management screen 100*a*. The number of the grid points 143P arranged along the vertical axis of the first management screen 100*a* is the same as a value in the vertical direction set in the preview image setting field 131*a*. The grid points 143P are arranged at predetermined intervals along a horizontal axis of the first management screen 100*a*. The number of the grid points 143P arranged along the horizontal axis of the first management screen 100*a* is the same as a value in the horizontal direction set in the preview image setting field 131*a*. The plurality of grid lines 143G includes the grid lines 143G along the vertical axis of the first management screen 100*a*, and the grid lines 143G along the horizontal axis of the first management screen 100*a*. The grid lines 143G along the vertical axis of the first management screen 100*a* connect the grid points 143P arranged along the vertical axis. The grid lines 143G along the horizontal axis of the first management screen 100*a* connect the grid points 143P arranged along the horizontal axis. The preview image 143 corresponds to an example of an adjustment image. The grid points 143P each correspond to an example of a control point.

In the enlarged display window 145, there is displayed an enlarged preview image 147 obtained by enlarging a part of the preview image 143. The enlarged display window 145 is displayed based on enlarged display window data. The enlarged display window data is generated by the screen generator 45 based on the display window data. The enlarged display window data is included in the management screen data. The enlarged display window 145 shown in FIG. 6 is displayed so as to be superimposed on the display window 141. The display position of the enlarged display window 145 is not limited to the display position shown in FIG. 6. The enlarged display window 145 can be displayed at a position with a distance from the display window 141. An area including the display window 141 and the enlarged display window 145 corresponds to the preview image correction part 140. The enlarged display window 145 corresponds to an example of a first enlarged image. The enlarged preview image 147 corresponds to an example of a first enlarged adjustment image. The enlarged display window data corresponds to an example of enlarged display image data.

The enlarged display window data generated in the screen generator 45 is transmitted to the display 80 by the input/output unit 49. The display 80 receives the enlarged display window data. The display 80 displays the enlarged display window 145 in the first management screen 100*a* based on the enlarged display window data thus received. The display control device 40 makes the display 80 display the enlarged display window 145 based on the enlarged display window data.

The enlarged preview image 147 to be displayed in the enlarged display window 145 is constituted by enlarged grid points 147P and enlarged grid lines 147G. The enlarged grid points 147P are images obtained by enlarging the grid points 143P included in the preview image 143. The enlarged grid points 147P each correspond to an example of the control point. The enlarged grid lines 147G are images obtained by enlarging the grid lines 143G included in the preview image 143. By the enlarged display window 145 and the display window 141 being displayed, it is possible for the user to confirm an overall configuration of the preview image 143, and a detailed configuration of a part of the preview image 143. It becomes easy for the user to select desired one of the grid points 143P. Further, it becomes easy for the user to move desired one of the grid points 143P.

In the sub-window display area 150, there are displayed an area different from the geometric distortion correction area 130, and so on. In the sub-window display area 150, it is possible to display the layout/monitor area, or a part of the layout/monitor area as an example. When the user performs the operation input on the sub-window display area 150, an area to be displayed in the sub-window display area 150 is displayed on the first management screen 100*a* replacing the geometric distortion correction area 130.

In the edge blending area 160, there are displayed selection buttons for receiving the operation input related to edge blending, and so on. The edge blending area 160 is used when performing the geometric distortion correction on the projection image PG to be projected on the projection surface SC using the plurality of projectors 20.

In the projector setting area 170, there are displayed selection buttons for receiving the operation input related to settings of the projectors 20, and so on. The projector setting area 170 is used when the display control device 40 is coupled to at least one projector 20. The user performs the operation input on the selection button displayed in the projector setting area 170 when selecting the projector 20 which is made to project the comparative image CG on the projection surface SC as an example.

In the management screen 100, there is displayed the cursor 200. The cursor 200 moves in accordance with the operation input by the user. When the user performs the operation input of moving the mouse 90*b* as an example, the cursor 200 moves on the management screen 100. The cursor 200 points arbitrary one of the grid points 143P. The user uses the cursor 200 when performing selection or translation of arbitrary one of the grid points 143P. When the user moves the cursor 200 to arbitrary one of the grid points 143P, or the vicinity of that grid point 143P, that grid point 143P is selected. It is possible for arbitrary one of the grid points 143P located within a predetermined range with respect to the cursor 200 to be selected when the user performs a click operation on the mouse 90*b*. When the user performs a drag operation using the mouse 90*b* after arbitrary one of the grid points 143P is selected, that grid point 143P is translated. The input device 90 to be used by the user is not limited to the mouse 90b. It is possible for the user to perform the selection or the translation of the grid point 143P using a touch pen, a keyboard, or the like. The cursor 200 corresponds to an example of the pointing image for pointing the grid points 143P.

There is disclosed a method of controlling the display control device 40 of making the display 80 display the preview image 143 corresponding to the comparative image CG to be projected on the projection surface SC by the projector 20 to correct the preview image 143, wherein the preview image 143 is constituted by the plurality of grid points 143P, the display 80 is made to display the display window 141 for displaying the whole of the preview image 143, and the enlarged display window 145 for displaying the enlarged preview image 147 obtained by enlarging a part of the preview image 143, and the selection of the grid point 143P using the cursor 200 for pointing the grid points 143P is received.

It is possible for the user to select arbitrary one of the grid points 143P while confirming the whole of the preview image 143 and the detail of the preview image 143.

The display control device 40 makes the display 80 display the preview image 143 corresponding to the comparative image CG to be projected on the projection surface SC by the projector 20 to make the preview image 143 be corrected. The display control device 40 is provided with the screen generator 45 for generating the display window data for displaying the display window 141 including the whole of the preview image 143 constituted by the plurality of grid points 143P, and the enlarged display window data for displaying the enlarged display window 145 including the enlarged preview image 147 obtained by enlarging a part of the preview image 143, and the input/output unit 49 for transmitting the display window data and the enlarged display window data generated by the screen generator 45 to the display 80, and makes the display 80 display the display window 141 and the enlarged display window 145 based on the display window data and the enlarged display window data.

The display control device 40 makes the display 80 display the display window 141 and the enlarged display window 145. It is possible for the user to select arbitrary one of the grid points 143P while confirming the whole of the preview image 143 and the detail of the preview image 143.

The image adjustment program AP is executed by the display control device 40 which makes the display 80 display the preview image 143 corresponding to the comparative image CG to be projected on the projection surface SC by the projector 20 to make the preview image 143 be corrected. The preview image 143 is constituted by the plurality of grid points 143P. The image adjustment program AP makes the display 80 display the display window 141 for displaying the whole of the preview image 143, and the enlarged display window 145 for displaying the enlarged preview image 147 obtained by enlarging a part of the preview image 143, and the selection of the grid point 143P using the cursor 200 for pointing the grid points 143P is made to be received.

It is possible for the user to select arbitrary one of the grid points 143P while confirming the whole of the preview image 143 and the detail of the preview image 143.

Figure 7:
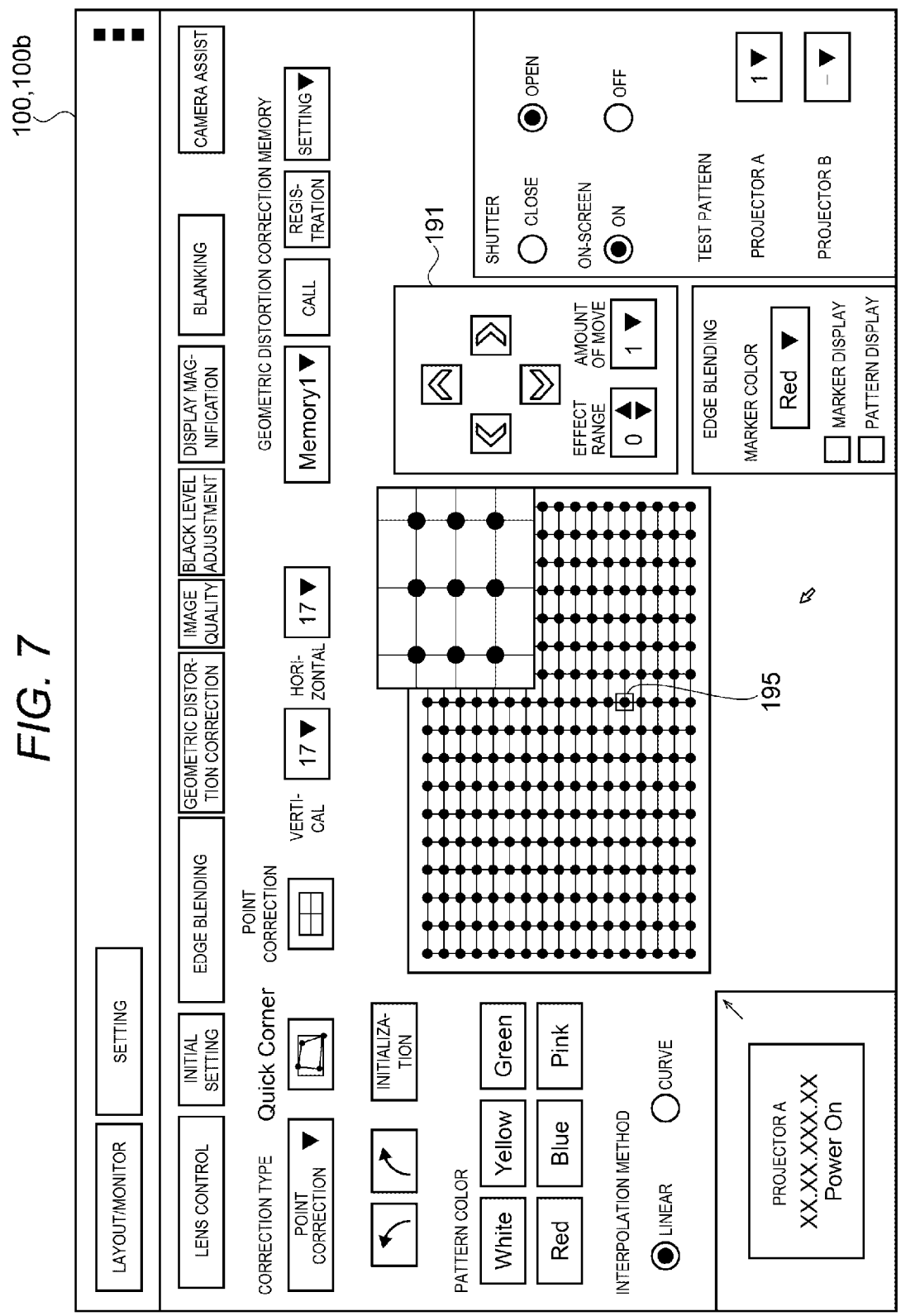
FIG. 7 is a diagram showing a configuration of the management screen.

FIG. 7 shows a configuration of the management screen 100. FIG. 7 shows a second management screen 100b as an example of the management screen 100. The second management screen 100b is displayed on the display 80 based on the control by the display control device 40. The second management screen 100b is displayed on the display 80 when the display control device 40 executes the image adjustment program AP. The second management screen 100b is a screen to be displayed when performing the geometric distortion correction.

In the second management screen 100b, there are displayed a point operation part 191 and a point image 195. The second management screen 100b is the same as the first management screen 100a except the point operation part 191 and the point image 195. Regarding the same constituents as those of the first management screen 100a, the description of the reference symbols is omitted in the second management screen 100b shown in FIG. 7.

In the point operation part 191, there are displayed a variety of icons for operating the position of the point image 195 displayed in the display window 141. The user performs the operation input on the variety of icons displayed in the point operation part 191 to thereby move the position of the point image 195. The user performs the operation input on the input device 90 such the keyboard 90a to thereby move the point image 195 using the point operation part 191.

The point image 195 is displayed so as to be superimposed on the grid point 143P. The point image 195 is displayed as an attention image for identifying the grid point 143P to be selected by the user. When the operation input is performed on the point operation part 191 by the user, the point image 195 moves in accordance with the operation input. The point image 195 corresponds to an example of the pointing image.

Figure 8:
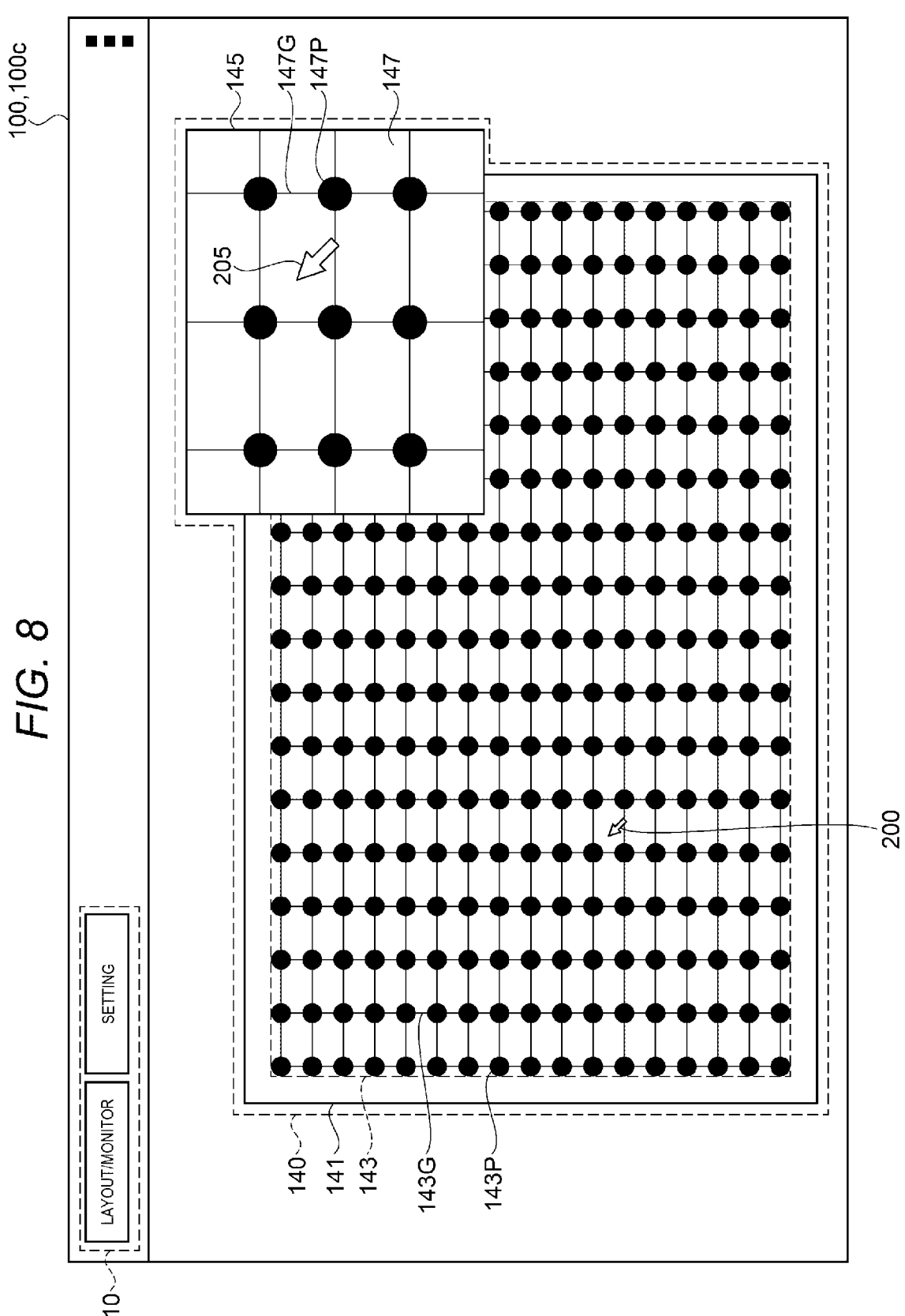
FIG. 8 is a diagram showing a configuration of the management screen.

FIG. 8 shows a configuration of the management screen 100. FIG. 8 shows a third management screen 100c as an example of the management screen 100. The third management screen 100c is displayed on the display 80 based on the control by the display control device 40. The third management screen 100c is displayed on the display 80 when the display control device 40 executes the image adjustment program AP. The third management screen 100c is a screen to be displayed when performing the geometric distortion correction.

In the third management screen 100c, there is displayed the preview image correction part 140 in an enlarged manner. When the user performs the predetermined operation input, the first management screen 100a is switched to the third management screen 100c. By the preview image correction part 140 being displayed in an enlarged manner, it becomes easy for the user to visually recognize the preview image 143. In the third management screen 100c, there are displayed the basic setting area 110 and the preview correction part 140, but configuration is not a limitation. It is possible to display the tub area 120 in the third management screen 100c. In the third management screen 100c, it is possible to display some of the constituents such as correction setting part 131 to be displayed in the geometric distortion correction area 130.

In the preview image correction part 140 displayed in the third management screen 100c, there are displayed the display window 141 and the enlarged display window 145. The enlarged display window 145 to be displayed in the third management screen 100c is displayed at an upper right side of the display window 141, but this configuration is not a limitation. The enlarged display window 145 can be displayed at a position different from the position shown in FIG. 8.

FIG. 8 shows a state in which the cursor 200 is displayed at a position on the display window 141. The position at which the cursor 200 is displayed on the display window 141 is hereinafter described as a pointing position. The pointing position corresponds to an example of a display position.

In the enlarged display window 145 displayed in the third management screen 100c, there is displayed the enlarged preview image 147 corresponding to the pointing position by the cursor 200. In the enlarged display window 145, there is displayed a cursor image 205 corresponding to the cursor 200. The cursor image 205 moves in tandem with the movement of the cursor 200. The cursor image 205 shown in FIG. 8 is an image obtained by magnifying the cursor 200. The cursor image 205 is not limited to the image obtained by enlarging the cursor 200. The cursor image 205 can be an image the same in size as the cursor 200, or can also be an image smaller than the cursor 200.

In the enlarged display window 145, there is displayed the enlarged preview image 147 around the pointing position by the cursor 200. The enlarged preview image 147 is an image obtained by enlarging an area centering on the pointing position. In other words, the enlarged preview image 147 is an image obtained by enlarging the area including the pointing position. The enlarged preview image 147 includes a plurality of the enlarged grid points 147P and a plurality of the enlarged grid lines 147G. It is preferable for the enlarged preview image 147 to include at least one enlarged grid point 147P. In the enlarged preview image 147 shown in FIG. 8, the enlarged grid point 147P obtained by enlarging the grid point 143P adjacent to the cursor 200 is displayed at the center of the enlarged display window 145. The center of the enlarged display window 145 is a geometric center of the enlarged display window 145. In the enlarged display window 145, there is displayed the enlarged preview image 147 centering on the enlarged grid point 147P which is obtained by enlarging the area centering on the grid point 143P high in possibility of being selected by the user out of the preview image 143. In other words, the enlarged preview image 147 includes the enlarged grid point 147P. It becomes easy for the user to select desired one of the grid points 143P.

The display control device 40 displays the enlarged preview image 147 obtained by enlarging an area corresponding to the pointing position by the cursor 200 displayed on the display window 141 out of the preview image 143 in the enlarged display window 145.

By the preview image 143 around the cursor 200 being enlarged, it becomes easy for the user to select the grid point 143P.

Figure 9:
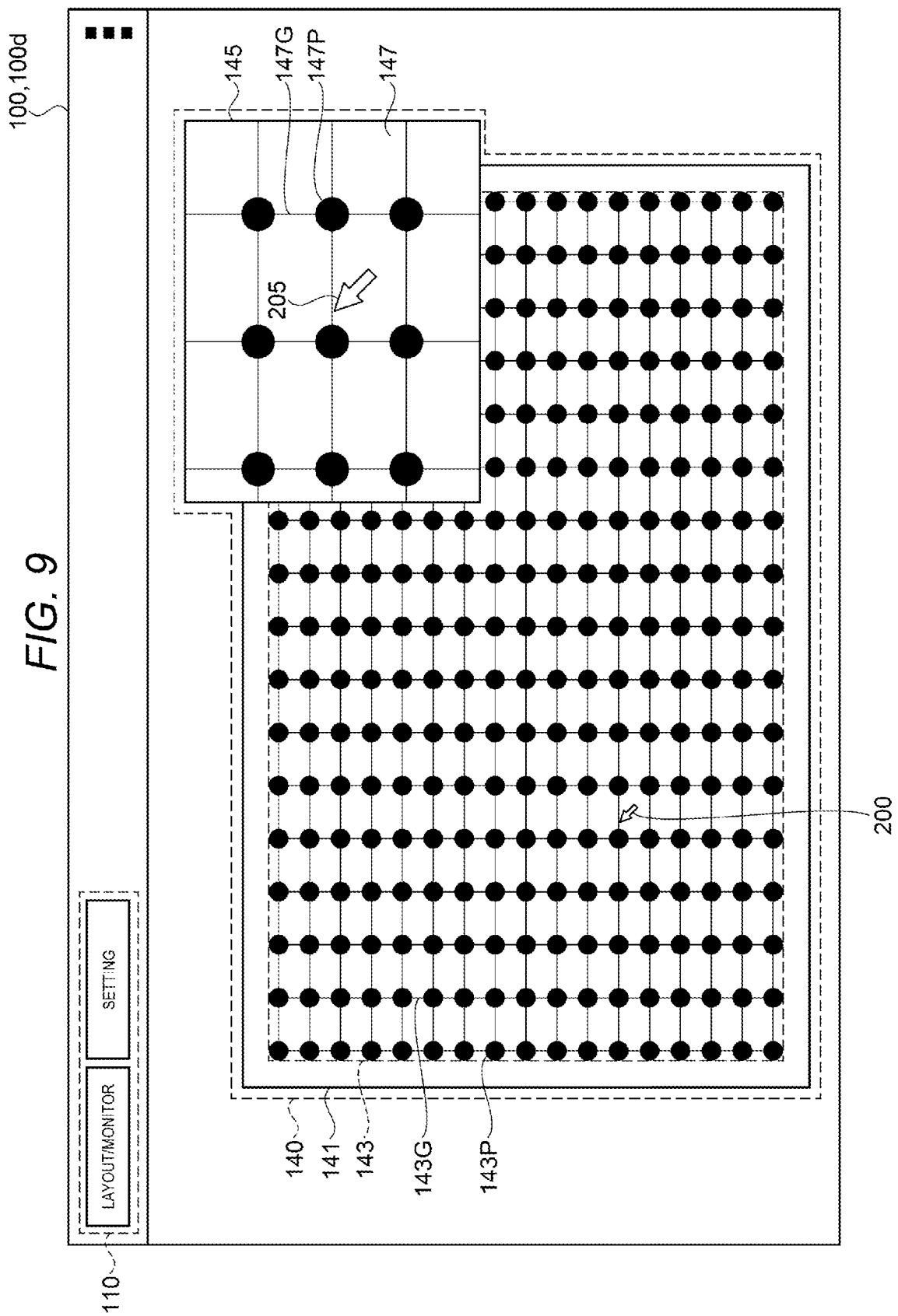
FIG. 9 is a diagram showing a configuration of the management screen.

FIG. 9 shows a configuration of the management screen 100. FIG. 9 shows a fourth management screen 100d as an example of the management screen 100. The fourth management screen 100d is displayed on the display 80 based on the control by the display control device 40. The fourth management screen 100d is displayed on the display 80 when the display control device 40 executes the image adjustment program AP. The fourth management screen 100d is a screen to be displayed when performing the geometric distortion correction. Similarly to the third management screen 100c, in the fourth management screen 100d, the preview image correction part 140 is enlarged.

The display aspect of the enlarged display window 145 to be displayed in the fourth management screen 100d is different from the display aspect of the enlarged display window 145 to be displayed in the third management screen 100c. In the enlarged display window 145 displayed in the fourth management screen 100d, there is displayed the enlarged preview image 147 obtained by enlarging an area centering on the pointing position out of the preview image 143. In FIG. 9, the tip position of the cursor 200 is assumed as the pointing position, but this is not a limitation. It is possible to assume the geometric centroid of the cursor 200 as the pointing position. In the enlarged display window 145 shown in FIG. 9, the tip of the cursor image 205 is displayed at the center of the enlarged display window 145.

The display control device 40 displays the enlarged preview image 147 obtained by enlarging the area centering on the pointing position out of the preview image 143 in the enlarged display window 145.

It becomes easy for the user to visually recognize the grid points 143P around the cursor 200.

It is possible for the enlarged display window 145 to move in accordance with the pointing position of the cursor 200 on the display window 141. The enlarged display window 145 is displayed at a position different from the position of the cursor 200. By the enlarged display window 145 being displayed at the position different from the position of the cursor 200, it is possible for the user to point the cursor 200 to desired one of the grid points 143P in the preview image 143 using the operation input to thereby select that grid point 143P.

The display control device 40 displays the enlarged display window 145 at a position on the display window 141 where the enlarged display window 145 does not overlap the pointing position.

It becomes easy for the user to visually recognize the pointing position by the cursor 200 in the whole of the preview image 143 and the enlarged preview image 147 around the pointing position.

Figure 10:
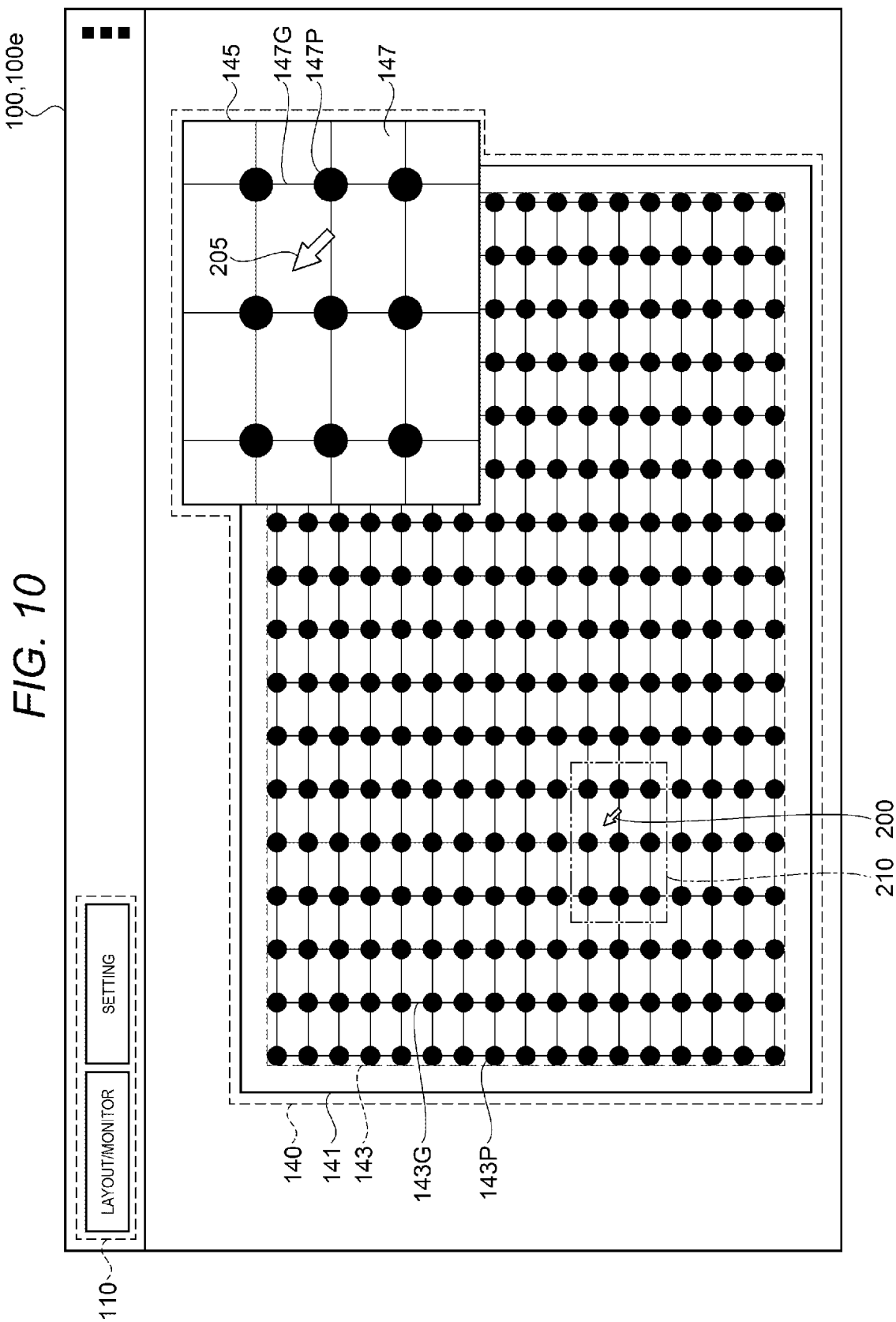
FIG. 10 is a diagram showing a configuration of the management screen.

FIG. 10 shows a configuration of the management screen 100. FIG. 10 shows a fifth management screen 100e as an example of the management screen 100. The fifth management screen 100e is displayed on the display 80 based on the control by the display control device 40. The fifth management screen 100e is displayed on the display 80 when the display control device 40 executes the image adjustment program AP. The fifth management screen 100e is a screen to be displayed when performing the geometric distortion correction. Similarly to the third management screen 100c, in the fifth management screen 100e, the preview image correction part 140 is enlarged.

In the fifth management screen 100e, there is displayed a window image 210 in the display window 141. The window image 210 represents a corresponding position to the enlarged preview image 147 displayed in the enlarged display window 145. The window image 210 represents a corresponding position corresponding to the enlarged preview image 147 on the display window 141. By the window image 210 being displayed, it becomes easy for the user to confirm the position of the enlarged preview image 147 displayed in the enlarged display window 145. The window image 210 corresponds to an example of an index.

It is possible for the window image 210 to be switched in state between display and nondisplay by the operation input by the user. When the user performs the predetermined operation input on the input device 90 such as the keyboard 90a, the window image 210 is switched in state between display and nondisplay.

When the display control device 40 displays the enlarged display window 145, the display control device 40 displays the window image 210 in the display window 141, wherein the window image 210 represents the corresponding position on the display window 141 of the enlarged preview image 147 to be displayed in the enlarged display window 145.

It becomes easy for the user to confirm the positional relationship of the enlarged preview image 147 in the whole of the preview image 143.

Figure 11:
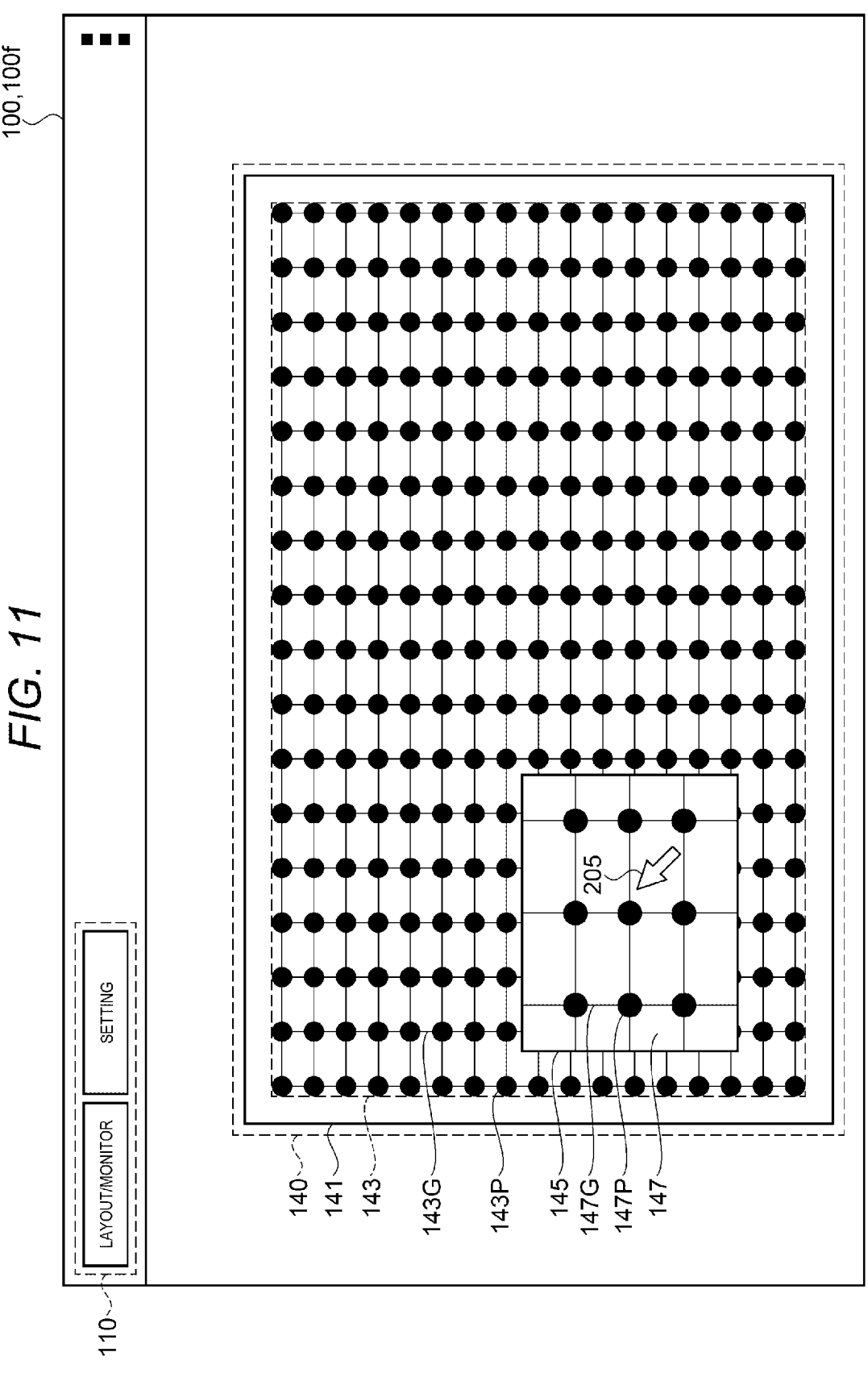
FIG. 11 is a diagram showing a configuration of the management screen.

FIG. 11 shows a configuration of the management screen 100. FIG. 11 shows a sixth management screen 100*f* as an example of the management screen 100. The sixth management screen 100*f* is displayed on the display 80 based on the control by the display control device 40. The sixth management screen 100*f* is displayed on the display 80 when the display control device 40 executes the image adjustment program AP. The sixth management screen 100*f* is a screen to be displayed when performing the geometric distortion correction. Similarly to the third management screen 100*c*, in the sixth management screen 100*f*, the preview image correction part 140 is enlarged.

In the sixth management screen 100*f*, there is displayed the enlarged display window 145 at a position where the enlarged display window 145 overlaps the pointing position by the cursor 200 in the display window 141. It is possible for the enlarged display window 145 to be displayed on the cursor 200 when the user performs a predetermined operation input as an example. It is possible for the enlarged display window 145 to be displayed on the cursor 200 in tandem with the movement of the cursor 200. The cursor image 205 represents the cursor 200. By the enlarged display window 145 being displayed at a position where the enlarged display window 145 overlaps the cursor 200, it becomes easy for the user to perform the selection and the translation of the grid point 143P.

The display control device 40 displays the enlarged display window 145 at a position where the enlarged display window 145 overlaps the pointing position.

It becomes easy for the user to perform the selection and the translation of the grid point 143P around the cursor 200.

Figure 12:
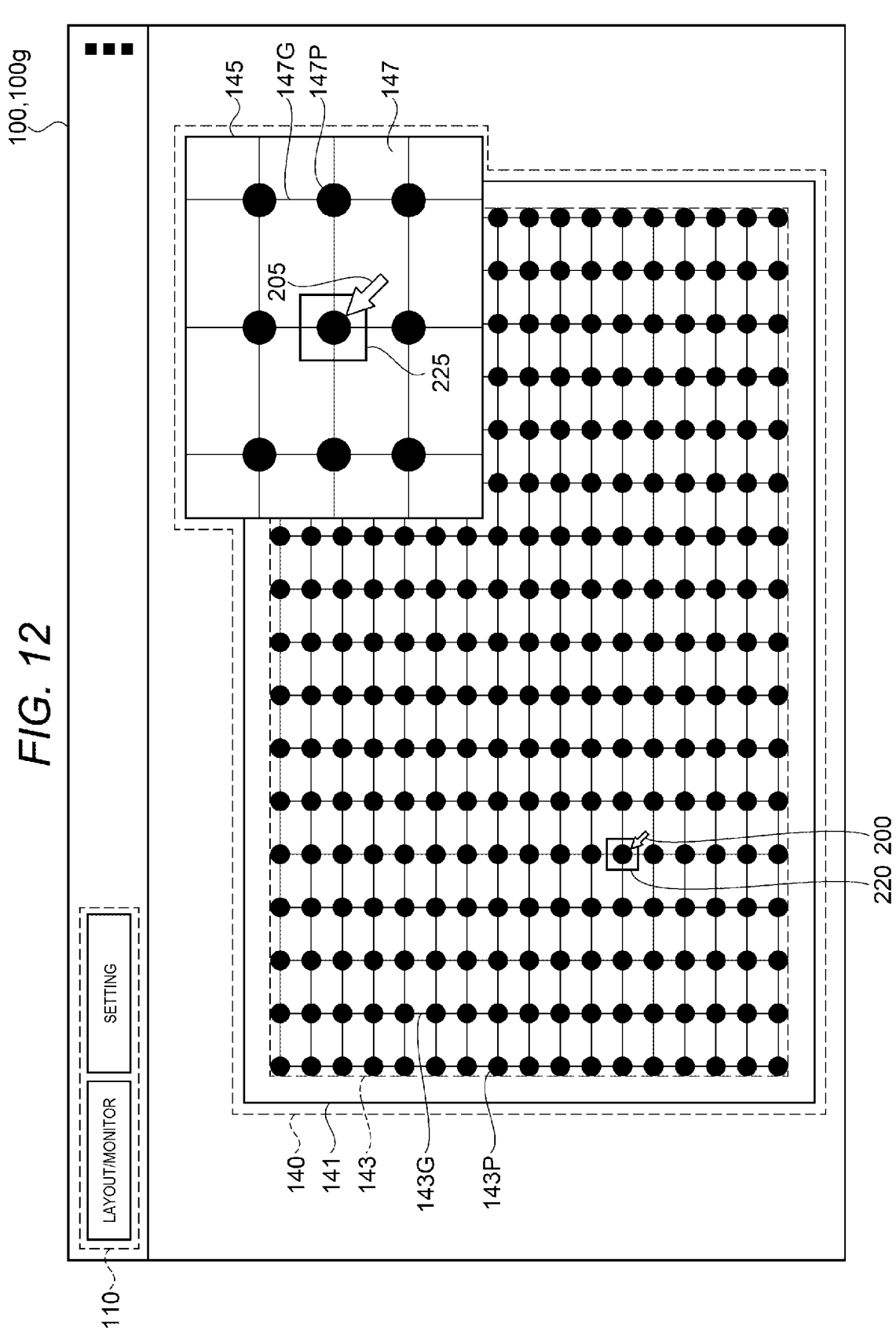
FIG. 12 is a diagram showing a configuration of the management screen.
Figure 13:
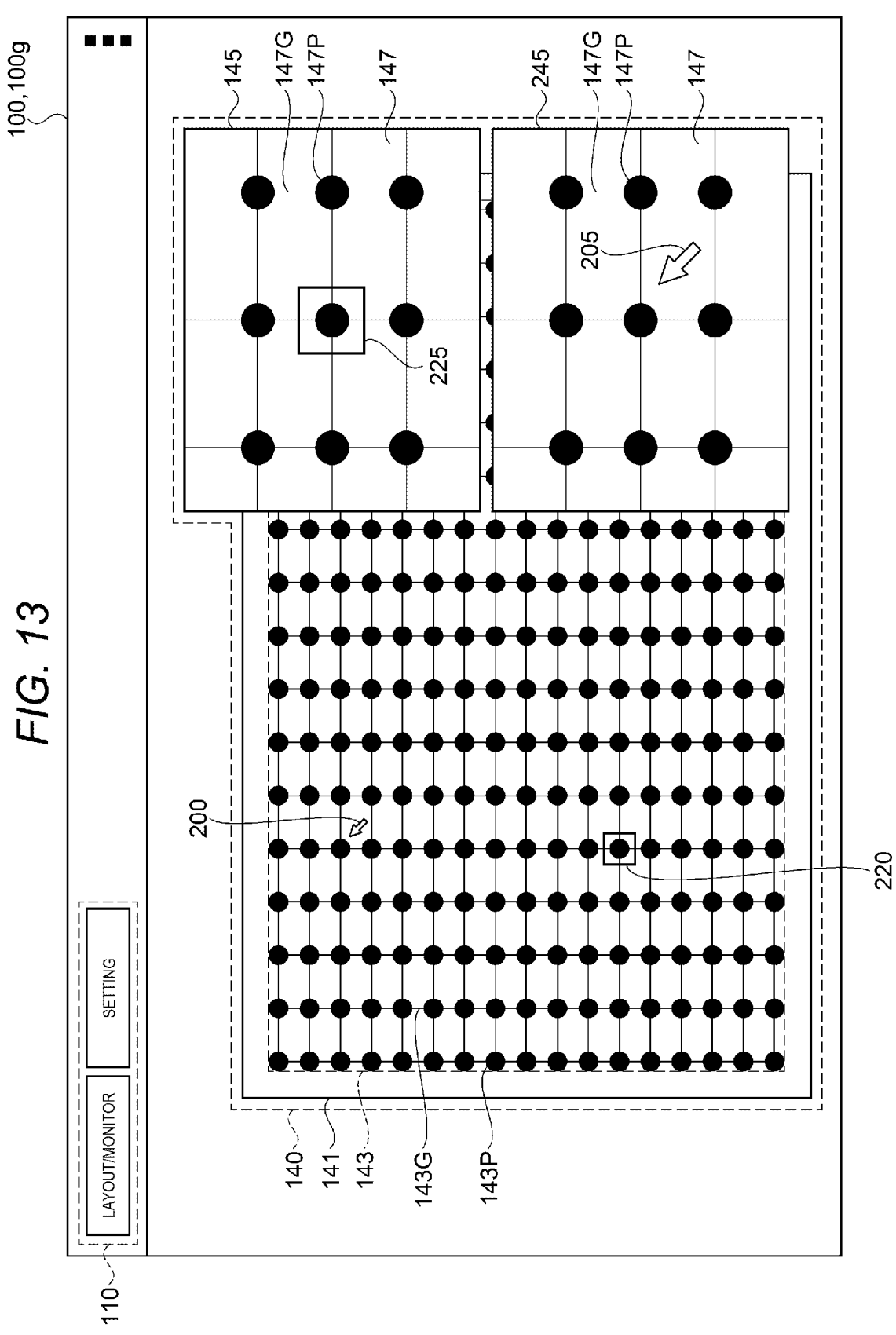
FIG. 13 is a diagram showing a configuration of the management screen.

FIG. 12 and FIG. 13 show a configuration of the management screen 100. FIG. 12 and FIG. 13 show a seventh management screen 100*g* as an example of the management screen 100. The seventh management screen 100*g* is displayed on the display 80 based on the control by the display control device 40. The seventh management screen 100*g* is displayed on the display 80 when the display control device executes the image adjustment program AP. The seventh management screen 100*g* is a screen to be displayed when performing the geometric distortion correction. Similarly to the third management screen 100*c*, in the seventh management screen 100*g*, the preview image correction part 140 is enlarged.

In the seventh management screen 100*g*, there are displayed a selection display image 220 and an enlarged selection display image 225. By the user performing a predetermined operation input on the grid point 143P or the enlarged grid point 147P, the grid point 143P on which the operation input is performed is selected. The user performs the operation input using the cursor 200. The user selects the grid point 143P using the cursor 200. The grid point 143P thus selected is a selected grid point. When the user selects the selected grid point, the selection display image 220 is displayed in the seventh management screen 100*g*. The selection display image 220 is a provided image representing the selected grid point. The grid point 143P thus selected is provided with the selection display image 220 to thereby be displayed as the selected grid point. The selected grid point corresponds to an example of a selected control point. The predetermined operation input performed by the user is a click operation on the grid point 143P or the enlarged grid point 147P as an example. The user performs the click operation using the input device such as the mouse 90*b*.

The selection display image 220 shown in FIG. 12 and FIG. 13 represents a quadrangle surrounding the grid point 143P, but this is not a limitation. The selection display image 220 can have a shape such as a circle or a triangle. The selection display image 220 can be displayed with a color different from that of the grid points 143P.

The enlarged selection display image 225 can be displayed in the seventh management screen 100*g* when the user selects the selected grid point. The enlarged selection display image 225 is a provided image representing the enlarged grid point 147P corresponding to the selected grid point.

The enlarged selection display image 225 shown in FIG. 12 and FIG. 13 represents a quadrangle surrounding the enlarged grid point 147P, but this is not a limitation. The enlarged selection display image 225 can have a shape such as a circle or a triangle. The enlarged selection display image 225 can be displayed with a color different from that of the enlarged grid points 147P. The shape of the enlarged selection display image 225 can be the same as the shape of the selection display image 220, or can also be different therefrom. The enlarged selection display image 225 is not required to be displayed.

The display control device 40 displays the grid point 143P selected using the cursor 200 as the selected grid point.

It becomes easy for the user to confirm the selected grid point.

In the enlarged display window 145, it is possible to display the enlarged preview image 147 obtained by enlarging the area centering on the selected grid point out of the preview image 143. In other words, the enlarged preview image 147 is obtained by enlarging the area including the selected grid point out of the preview image 143. In the enlarged display window 145, there is displayed the enlarged preview image 147 in which the enlarged grid point 147P represented by the enlarged selection display image 225 is located at the center of the enlarged display window 145. In the enlarged display window 145, there is displayed the enlarged preview image 147 centering on the selected grid point as a result.

When the display control device 40 displays the selected grid point, the display control device 40 displays the enlarged preview image 147 obtained by enlarging the area centering on the selected grid point out of the preview image 143, in the enlarged display window 145.

It becomes easy for the user to figure out the position of the selected grid point.

When the cursor 200 is located in the enlarged preview image 147, the cursor image 205 is displayed in the enlarged display window 145. When the cursor 200 moves to a position outside the enlarged preview image 147, the cursor image 205 is not displayed in the enlarged display window 145.

It is possible to display a second enlarged display window 245 shown in FIG. 13 in the seventh management screen 100*g* when the cursor 200 moves to the position outside the enlarged preview image 147. In the second enlarged display window 245, there is displayed the enlarged preview image 147 corresponding to the preview image 143 around the pointing position by the cursor 200. In the enlarged display window 145, there is displayed the enlarged preview image 147 around the selected grid point. The second enlarged display window 245 corresponds to an example of a second enlarged image. The enlarged preview image 147 included in the second enlarged display window 245 corresponds to a second enlarged adjustment image.

In the seventh management screen 100*g*, it is possible to display the second enlarged display window 245 irrespective of the position of the cursor 200. When the display control device 40 makes the display 80 display the seventh management screen 100g, the second enlarged display window 245 can be displayed in the preview image correction part 140. When the user performs the predetermined operation input, the second enlarged display window 245 can be displayed in the preview image correction part 140. When the user selects the selected grid point, the second enlarged display window 245 can be displayed in the preview image correction part 140. It is possible for the user to select a plurality of the selected grid points. By the second enlarged display window 245 being displayed, it becomes easy for the user to select a second selected grid point.

When the display control device 40 displays the selected grid points, the display control device 40 further displays the second enlarged display window 245 for displaying the enlarged preview image 147 obtained by enlarging the area corresponding to the pointing position out of the preview image 143.

It is possible for the user to confirm the enlarged preview image 147 of the enlarged selected grid point corresponding to the selected grid point, and the enlarged preview image 147 corresponding to the pointing position by the cursor 200.

When the user moves the position of the selected grid point, the second enlarged display window 245 can be set on the nondisplay state. The user performs the operation input to thereby move the position of the selected grid point. It is possible for the user to move the selected grid point using the point operator 191 shown in FIG. 7 as an example. By the user moving the selected grid point, the position of the selected grid point is adjusted. The point operator 191 is displayed on the seventh management screen 100g by a predetermined operation input. When the point operator 191 is displayed in the seventh management screen 100g, it is possible for the display control device 40 to control the second enlarged display window 245 to be in the nondisplay state. When the user performs the predetermined operation input, it is possible for the display control device 40 to control the second enlarged display window 245 to be in the nondisplay state.

When the position of the selected grid point is adjusted, the display control device 40 set the second enlarged display window 245 on the nondisplay state.

It becomes easy for the user to adjust the position of the selected grid point.

In FIG. 12 and FIG. 13, the selected grid point is displayed by providing the selection display image 220 to the selected grid point, but this is not a limitation. The selected grid point can be displayed in a different display aspect from those of the rest of the grid points 143P. The display aspect is a color, a shape, a size, or the like. The selected grid point can be displayed with a different color from those of the rest of the grid points 143P as an example.

In FIG. 12 and FIG. 13, the enlarged selection display image 225 is provided to the enlarged grid point 147P corresponding to the selected grid point, but this is not a limitation. The enlarged grid point 147P corresponding to the selected grid point can be displayed in a different display aspect from those of the rest of the enlarged grid points 147P. The display aspect is a color, a shape, a size, or the like.

When the cursor 200 is located in a given range determined in advance, the enlarged display window 145 can be displayed in the preview image correction part 140. The display control device 40 displays the enlarged display window 145 in the preview image correction part 140 based on the position of the cursor 200.

Figure 14:
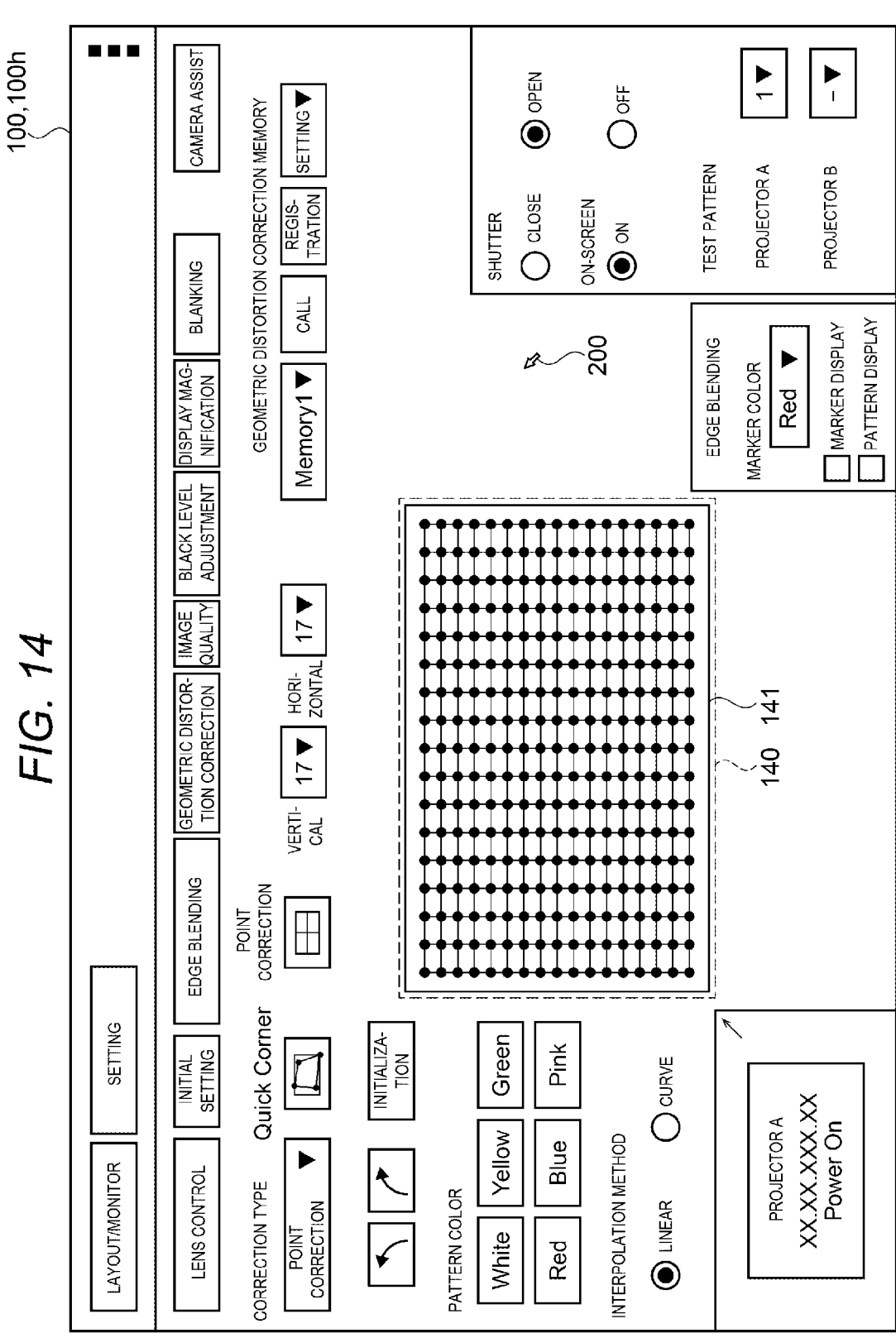
FIG. 14 is a diagram showing a configuration of the management screen.
Figure 15:
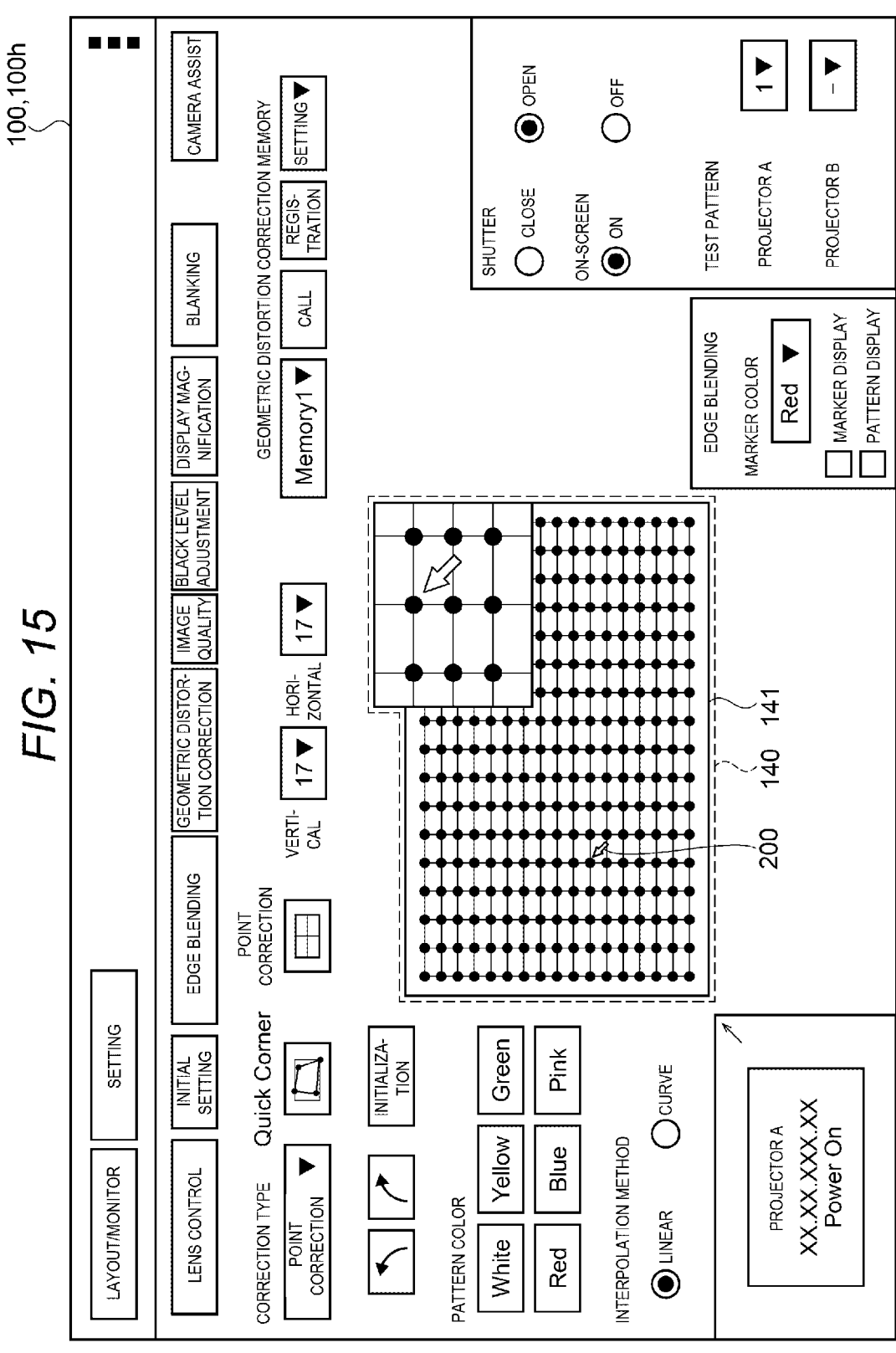
FIG. 15 is a diagram showing a configuration of the management screen.

FIG. 14 and FIG. 15 show a configuration of the management screen 100. FIG. 14 and FIG. 15 show an eighth management screen 100h as an example of the management screen 100. The eighth management screen 100h is displayed on the display 80 based on the control by the display control device 40. The eighth management screen 100h is displayed on the display 80 when the display control device executes the image adjustment program AP. The eighth management screen 100h is a screen to be displayed when performing the geometric distortion correction. In FIG. 14 and FIG. 15, the reference symbols of the same constituents as in FIG. 6 are omitted.

FIG. 14 shows the eighth management screen 100h when the cursor 200 is located in other areas than the preview image correction part 140. The preview image correction part 140 shown in FIG. 14 is the same, or substantially the same area as the display window 141. In the preview image correction part 140, the enlarged display window 145 is not displayed. It is possible for the user to visually recognize the whole of the preview image 143 displayed in the display window 141.

FIG. 15 shows the eighth management screen 100h when the cursor 200 is located in an area inside the preview image correction part 140. The cursor 200 is located on the display window 141. When the cursor 200 is located in the preview image correction part 140 or the display window 141, the display control device 40 makes the display 80 display the enlarged display window 145. It is possible for the user to confirm the enlarged preview image 147 corresponding to the pointing position by the cursor 200. The given range determined in advance corresponds to the preview image correction part 140 or the display range of the display window 141.

It is possible for the display control device 40 to control the enlarged display window 145 to be in the nondisplay state when the cursor 200 moves from the inside of the preview image correction part 140 to the outside of the preview image correction part 140.

When the cursor 200 is located inside the display window 141, the display control device 40 makes the display 80 display the enlarged display window 145.

It becomes easy for the user to confirm the preview image 143 displayed in the display window 141.

The given range determined in advance is not limited to the preview image correction part 140 or the display range of the display window 141. The given range determined in advance can be set based on a distance from the grid points 143P.

Figure 16:
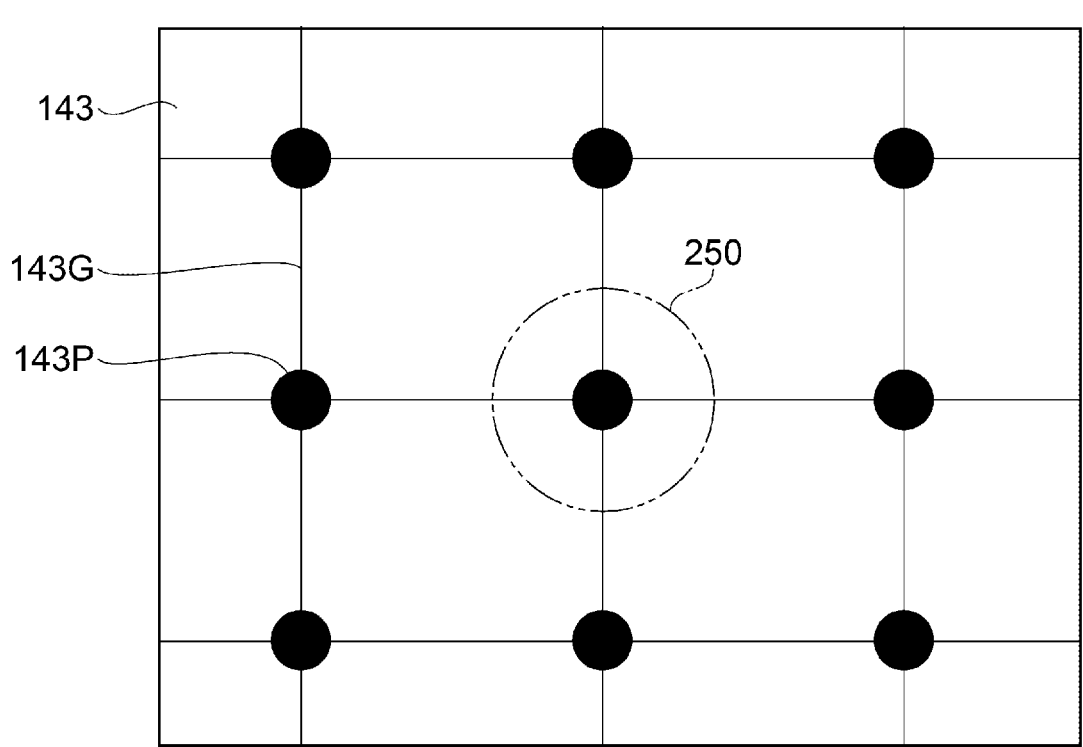
FIG. 16 is a diagram showing a part of a preview image in an enlarged manner.

FIG. 16 shows a part of the preview image 143 in an enlarged manner. FIG. 16 shows a display area 250. The display area 250 represents a predetermined range centering on the grid point 143P. The predetermined range is a range of 20 through 30 pixels from the center of the grid point 143P as an example. The numerical value of the pixel range can arbitrarily be set. FIG. 16 shows the display area 250 with respect to one of the grid points 143P. The display area 250 is set for each of the grid points 143P.

When the cursor 200 is located outside the display area 250, the enlarged display window 145 is not displayed in the preview image correction part 140 as in the eighth management screen 100h shown in FIG. 14. When the cursor 200 is located inside the display area 250, it is possible for the enlarged display window 145 to be displayed in the preview image correction part 140. When the cursor 200 is located inside the display area 250, the display control device 40 makes the display 80 display the enlarged display window 145.

When the cursor 200 is located within a predetermined range with respect to one grid point 143P included in the preview image 143 displayed in the display window 141, the display control device 40 makes the display display the enlarged display window 145.

When the cursor 200 comes closer to the grid point 143P, the enlarged display window 145 is displayed. It becomes easy for the user to select the grid point 143P.

Processing units of the flowchart shown in FIG. 4 is obtained by dividing processing of the display control device 40 in accordance with major processing contents in order to make the processing easy to understand. The scope of the present disclosure is not limited by the way of the division or the names of the processing units shown in the flowchart of FIG. 4. Further, the processing of the display control device 40 can also be divided into a larger number of processing units, or can also be divided so that one processing unit includes a larger amount of processing in accordance with the processing contents. Further, the processing sequence of the flowchart described above is not limited to the illustrated example.

In the embodiment described above, there is adopted the configuration in which the display control device 40 receives the correction of the grid points 143P after making the projector 20 project the comparative image CG, but this aspect is not a limitation. For example, it is possible to adopt a configuration in which the display control device 40 receives the correction of the grid points 143P without making the projector 20 project the comparative image CG. It is sufficient that the correction data generated based on the correction of the grid points 143P received by the display control device 40 can be transmitted to the projector 20. For example, when it is desired to generate the correction data while projecting an arbitrary video content from the projector 20, it is not required to make the projector 20 project the comparative image CG.

What is claimed is:

1. A control method comprising:
displaying a display image including an adjustment image constituted by a plurality of control points;
displaying a first enlarged image including a first enlarged adjustment image obtained by enlarging a part of the adjustment image;
receiving an operation input configured to select the control point using a pointing image for pointing any of the plurality of control points;
displaying the control point selected using the pointing image as a selected control point different in display aspect from the control points, wherein when displaying the selected control point, the first enlarged adjustment image is an image obtained by enlarging an area including the selected control point;
further displaying a second enlarged image including a second enlarged adjustment image obtained by enlarging an area corresponding to a display position of the pointing image to be displayed on the display image when displaying the selected control point;
receiving an operation input of adjusting a position of the control point using a pointing image configured to point the control point; and
setting the second enlarged image on a nondisplay state when receiving an operation input of adjusting a position of the selected control point.

2. The control method according to claim 1, wherein the first enlarged adjustment image is an image obtained by enlarging an area corresponding to a display position of the pointing image to be displayed on the display image.

3. The control method according to claim 2, wherein the first enlarged adjustment image is an image obtained by enlarging an area including the display position.

4. The control method according to claim 2, wherein the displaying the first enlarged image includes displaying the first enlarged image at a position on the display image where the first enlarged image fails to overlap the display position.

5. The control method according to claim 4, further comprising:
displaying an index, which represents a corresponding position of the first enlarged adjustment image on the display image, in the display image when displaying the first enlarged image.

6. The control method according to claim 2, wherein the displaying the first enlarged image includes displaying the first enlarged image at a position on the display image where the first enlarged image overlaps the display position.

7. The control method according to claim 1, wherein the displaying the first enlarged image includes displaying the first enlarged image when the pointing image is located in the display image.

8. The control method according to claim 1, wherein the displaying the first enlarged image includes displaying the first enlarged image when the pointing image is located within a predetermined range with respect to one of the control points, the one of the control points being included in the adjustment image displayed in the display image.

9. A control device comprising:
at least one processor configured to execute;
generating display image data configured to make a display device display a display image including an adjustment image constituted by a plurality of control points, and enlarged display image data configured to make the display device display a first enlarged image including a first enlarged adjustment image obtained by enlarging a part of the adjustment image;
receiving an operation input of selecting the control point using a pointing image for pointing the control point;
generating display image data configured to make the display device display the control point selected using the pointing image as a selected control point different in display aspect from the control points, wherein when displaying the selected control point, the first enlarged adjustment image is an image obtained by enlarging an area including the selected control point;
further generating enlarged display image data configured to make the display device display a second enlarged image including a second enlarged adjustment image obtained by enlarging an area corresponding to a display position of the pointing image to be displayed on the display image when displaying the selected control point;
receiving an operation input of adjusting a position of the control point using a pointing image configured to point the control point; and
setting the second enlarged image on a nondisplay state when receiving an operation input of adjusting a position of the selected control point.

10. A non-transitory computer-readable storage medium storing a control program of making at least one processor execute processing comprising:

displaying a display image including an adjustment image constituted by a plurality of control points;

displaying a first enlarged image including a first enlarged adjustment image obtained by enlarging a part of the adjustment image; receiving an operation input of selecting the control point using a pointing image for pointing the control point;

displaying the control point selected using the pointing image as a selected control point different in display aspect from the control points, wherein when displaying the selected control point, the first enlarged adjustment image is an image obtained by enlarging an area including the selected control point;

further displaying a second enlarged image including a second enlarged adjustment image obtained by enlarging an area corresponding to a display position of the pointing image to be displayed on the display image when displaying the selected control point;

receiving an operation input of adjusting a position of the control point using a pointing image configured to point the control point; and setting the second enlarged image on a nondisplay state when receiving an operation input of adjusting a position of the selected control point.

* * * * * 25